United States Patent
Lee et al.

(10) Patent No.: US 10,867,074 B2
(45) Date of Patent: Dec. 15, 2020

(54) ELECTRONIC DEVICE AND CONTROL METHOD THEREOF

(71) Applicant: Samsung Electronics Co., Ltd., Suwon-si, Gyeonggi-do (KR)

(72) Inventors: Yun Jin Lee, Suwon-si (KR); Seung Hyun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/181,761

(22) Filed: Nov. 6, 2018

(65) Prior Publication Data
US 2019/0138741 A1 May 9, 2019

(30) Foreign Application Priority Data

Nov. 8, 2017 (KR) .................... 10-2017-0147918

(51) Int. Cl.
*G06F 21/62* (2013.01)
*G06F 21/60* (2013.01)
*H04L 29/06* (2006.01)
*G06F 3/0484* (2013.01)
*H04M 1/725* (2006.01)

(52) U.S. Cl.
CPC .......... *G06F 21/629* (2013.01); *G06F 21/604* (2013.01); *H04L 63/107* (2013.01); *G06F 3/04842* (2013.01); *G06F 2221/2111* (2013.01); *H04M 1/72519* (2013.01)

(58) Field of Classification Search
CPC ..... G06F 2221/2141; G06F 2221/2111; G06F 21/62; H04L 63/107
See application file for complete search history.

(56) References Cited

U.S. PATENT DOCUMENTS

| 9,256,755 | B2 | 2/2016 | Nicolaou |
| 2012/0209946 | A1 | 8/2012 | McClure et al. |
| 2013/0055378 | A1 | 2/2013 | Chang et al. |
| 2013/0237187 | A1 | 9/2013 | Park et al. |

(Continued)

FOREIGN PATENT DOCUMENTS

| EP | 3 040 899 A1 | 7/2016 |
| EP | 3 295 363 A1 | 3/2018 |

(Continued)

OTHER PUBLICATIONS

International Office Action dated Feb. 15, 2019; International Application #: PCT/KR2018/013394.

(Continued)

*Primary Examiner* — Thaddeus J Plecha
(74) *Attorney, Agent, or Firm* — Jefferson IP Law, LLP

(57) ABSTRACT

An electronic device capable of controlling an access right of an application and a controlling method thereof are provided. The controlling method of the electronic device for executing the application includes, in response to an event for inquiring about whether to allow an access right to a function of the electronic device required for executing an application, displaying a user interface (UI) to confirm whether to allow the access right, and in response to a user command being input through the UI, matching and storing a state of the application according to the event and a determination of whether to allow the access right according to the user command.

18 Claims, 27 Drawing Sheets

(56) References Cited

U.S. PATENT DOCUMENTS

| | | | |
|---|---|---|---|
| 2014/0020085 A1* | 1/2014 | Srour | G06F 9/4843 726/17 |
| 2014/0046844 A1* | 2/2014 | Grigg | G06Q 20/20 705/44 |
| 2014/0273820 A1* | 9/2014 | Narayan | H04L 69/40 455/41.1 |
| 2014/0316841 A1* | 10/2014 | Kilby | G06K 9/00442 705/7.26 |
| 2015/0150119 A1 | 5/2015 | Holland et al. | |
| 2015/0181434 A1 | 6/2015 | Kenney | |
| 2015/0242621 A1 | 8/2015 | Jackson et al. | |
| 2015/0281238 A1 | 10/2015 | Ramachandran et al. | |
| 2016/0191534 A1* | 6/2016 | Mallozzi | G06F 21/6218 726/4 |
| 2017/0011215 A1* | 1/2017 | Poiesz | G06F 21/52 |
| 2017/0118611 A1 | 4/2017 | Schieman et al. | |
| 2017/0193276 A1 | 7/2017 | Choi et al. | |
| 2017/0340956 A1* | 11/2017 | Roberts | A63F 13/20 |
| 2019/0081949 A1* | 3/2019 | Wu | G06F 8/62 |
| 2019/0130107 A1* | 5/2019 | Huang | G06F 21/566 |

FOREIGN PATENT DOCUMENTS

| | | |
|---|---|---|
| JP | 2017-511619 A | 4/2017 |
| KR | 10-1347458 B1 | 1/2014 |
| KR | 10-2015-0032429 A | 3/2015 |
| WO | 2015/104726 A1 | 7/2015 |
| WO | 2016/182272 A1 | 11/2016 |
| WO | 2017/075088 A1 | 5/2017 |

OTHER PUBLICATIONS

Extended European Search Report dated Apr. 28, 2020, issued in European Patent Application No. 18876966.5-1218.

* cited by examiner

FIG. 4A

| subject | object | access rule |
|---------|--------|-------------|
| app A | camera | allow |
| app A | internet | allow |
| app A | recorder | deny |

FIG. 4B

| subject | object | status id | access rule |
|---|---|---|---|
| app A | camera | 1 | allow |
| | | 2 | deny |
| app A | internet | 1 | allow |
| | | 2 | allow |
| | | 3 | deny |
| | | 4 | allow |
| app A | recorder | 1 | deny |

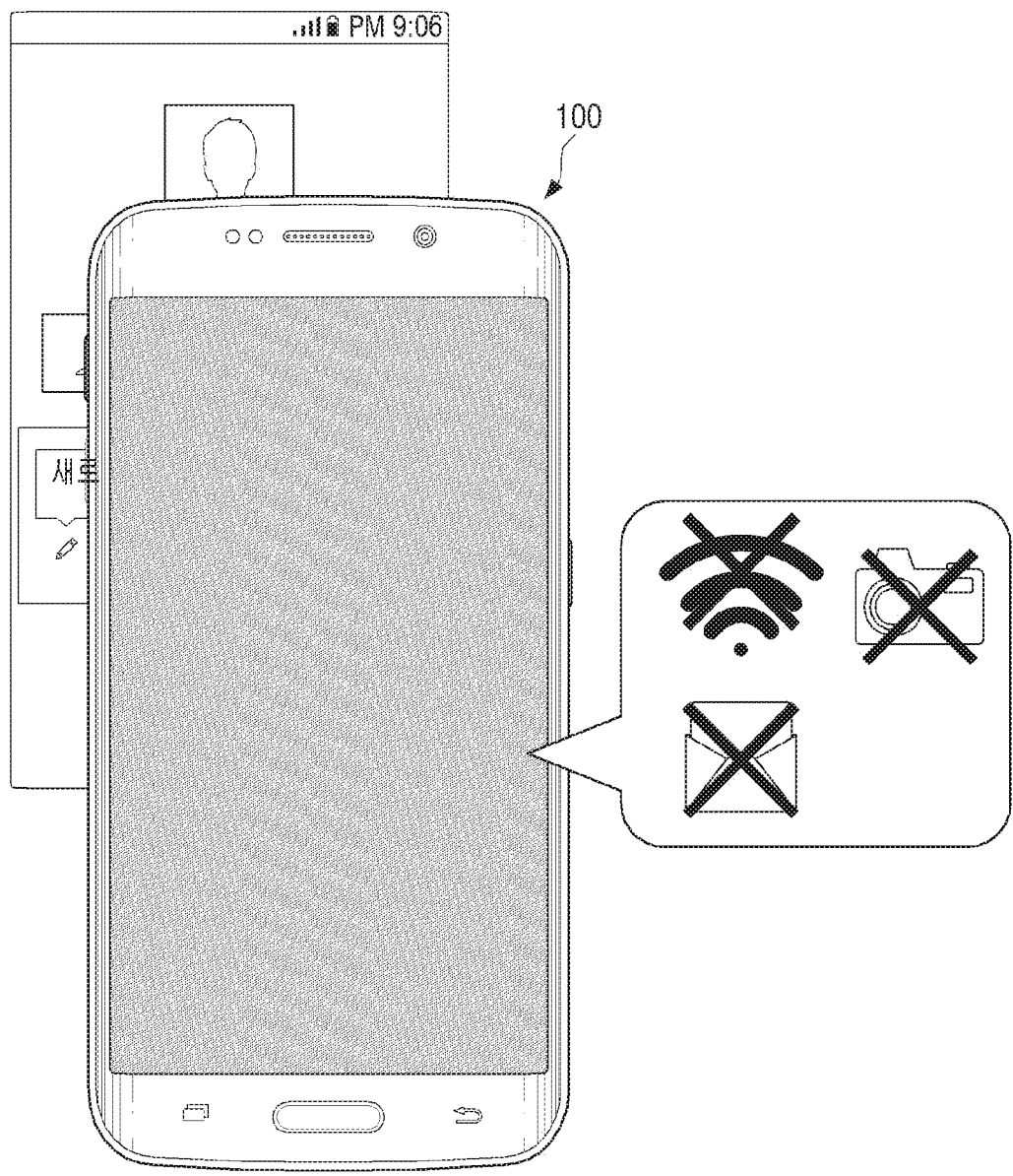

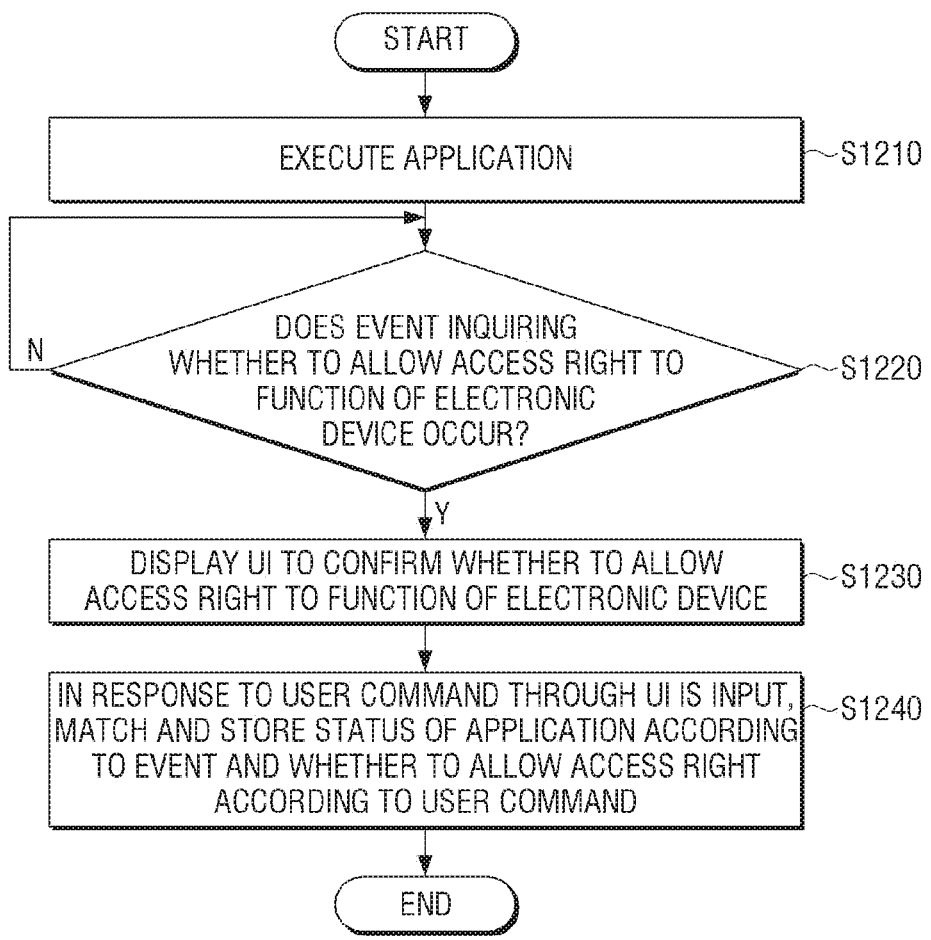

ELECTRONIC DEVICE AND CONTROL METHOD THEREOF

CROSS-REFERENCE TO RELATED APPLICATIONS(S)

This application is based on and claims priority under 35 U.S.C. § 119 of a Korean patent application number 10-2017-0147918, filed on Nov. 8, 2017, in the Korean Intellectual Property Office, the disclosure of which is incorporated by reference herein in its entirety.

BACKGROUND

1. Field

The disclosure relates to an electronic device for executing an application and a control method. More particularly, the disclosure relates to an electronic device and a control method thereof capable of changing an access right to a specific function of an electronic device in accordance with a state change of an application.

2. Description of Related Art

With the development of electronic technology and software technology, a user can be provided with an application capable of performing various functions. In recent years, various types of applications have been provided for the convenience of users. When an application wants to use a specific function (for example, a camera function, an Internet function, a memory storage function, etc.) of an electronic device for security reasons or the like, an access right to the corresponding function is required.

However, users often do not know exactly what access rights their application needs. For example, in most applications, when an application's access right is set, the application can use certain functions without the user's consent. In addition, in some cases, since a specific application requires excessive access rights, a user's personal information is likely to be leaked to the outside while the user does not recognize.

Therefore, a method for efficiently managing an access right of an application is necessary.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic device which sets an access right to a function of an electronic device according to a user interface (UI) inquiring about whether to allow the access right according to a status condition of an executed application and a user command input through the UI, and a controlling method thereof.

Additional aspects will be set forth in part in the description which follows and, in part, will be apparent from the description, or may be learned by practice of the presented embodiments.

In accordance with an aspect of the disclosure, a controlling method of an electronic device for executing an application is provided. The controlling method includes, in response to an event for inquiring about whether to allow an access right to a function of the electronic device required for executing an application, displaying a user interface (UI) to confirm whether to allow the access right, and in response to a user command being input through the UI, matching and storing a state of the application according to the event and a determination of whether to allow the access right according to the user command.

The displaying of the UI may include, in response to a change of an execution status of the application, displaying a UI for inquiring about whether to allow the access right to the function of the electronic device corresponding to the application.

The method may further include changing an execution status of the application from a status executed in a foreground to a status executed in a background, and in response to a change of the application from the foreground status to the background status, matching and storing a function corresponding to the background status with the determination of whether to allow the access right to the function.

The method may further include, in response to the application being in the background status, executing the function according to the determination of whether to allow the access right stored in the background status.

The method may further include, in response to the application being executed in the background, and a state of a battery of the electronic device being equal to or less than a preset value, blocking the access right to the function of the electronic device corresponding to the application.

The method may further include, in response to the application not being executed for a predetermined time, blocking the access right to the function corresponding to the application.

The method may include, in response to the electronic device being connected to a predetermined network, allowing an access right to a network function corresponding to the application.

The method may further include, in response to an event with respect to execution of a specific function of the electronic device occurring, determining whether an access right to an execution of the specific function is allowed, and in response to determining that the access right to the specific function is not being allowed, displaying a UI for confirming whether to allow an access right to the specific function.

The method may further include, in response to the application being initially executed, displaying a UI for inquiring whether to allow a right required to execute a foreground, a right required to execute a background, and a right temporarily required for authentication.

The method may further include, when a function corresponding to the application includes a function temporarily required for authentication, and the authentication is completed, blocking an access right to a function that is temporarily necessary for the authentication.

In accordance with another aspect of the disclosure, an electronic device which executes an application is provided. The electronic device includes a memory, a display, and at least one processor configured to, in response to an event for inquiring about whether to allow an access right to a function of the electronic device required for executing an application, control the display to display a user interface (UI) to confirm whether to allow the access right, and in response to a user command being input through the UI, control the memory to match and store a state of the application according to the event and a determination of whether to allow the access right according to the user command.

The at least one processor may further be configured to, in response to a change of an execution status of the application being sensed, control the display to display a UI for inquiring about whether to allow the access right to the function of the electronic device corresponding to the application.

The at least one processor may further be configured to change an execution status of the application from a status executed in a foreground to a status executed in a background, and in response to a change of the application from the foreground status to the background status, control the memory to match and store a function corresponding to the background status with the determination of whether to allow the access right to the function.

The at least one processor may further be configured to, in response to the application being in the background status, control the application to execute the function according to a determination of whether to allow the access right stored in the background status.

The at least one processor may further be configured to, in response to the application being executed in the background, and a state of a battery of the electronic device being equal to or less than a preset value, block the access right to the function of the electronic device corresponding to the application.

The at least one processor may further be configured to, in response to the application not being executed for a predetermined time, block the access right to the function corresponding to the application.

In accordance with another aspect of the disclosure the electronic device further includes a communication circuit, wherein the at least one processor may further be configured to, in response to the electronic device being connected to a predetermined network, allow an access right to a network function corresponding to the application.

The at least one processor may further be configured to, in response to an event with respect to execution of a specific function of the electronic device occurring, determine whether an access right to an execution of the specific function is allowed, and in response to determining that the access right to the specific function not being allowed, control the display to display a UI for confirming whether to allow an access right to the specific function.

The at least one processor may further be configured to, in response to the application being initially executed, control the display to display a UI for inquiring whether to allow a right required to execute a foreground, a right required to execute a background, and a right temporarily required for authentication.

The at least one processor may further be configured to, when a function corresponding to the application includes a function temporarily required for authentication and the authentication is completed, block an access right to a function that is temporarily necessary for the authentication.

As described above, according to various embodiments, an electronic device may, if a status of an application is changed, set an access right which is suitable for a changed status.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A and 4B are views to describe an access right management table according to various embodiments of the disclosure;

FIGS. 8A, 8B, 8C, 9A, 9B, 10A, 10B, 10C, 11A, 11B, and 11C are views to describe various embodiments of the disclosure; and FIG. 12 is a flowchart to describe an operation of an electronic device according to an embodiment of the disclosure.

Throughout the drawings, like reference numerals will be understood to refer to like parts, components, and structures.

DETAILED DESCRIPTION

Figure 1:
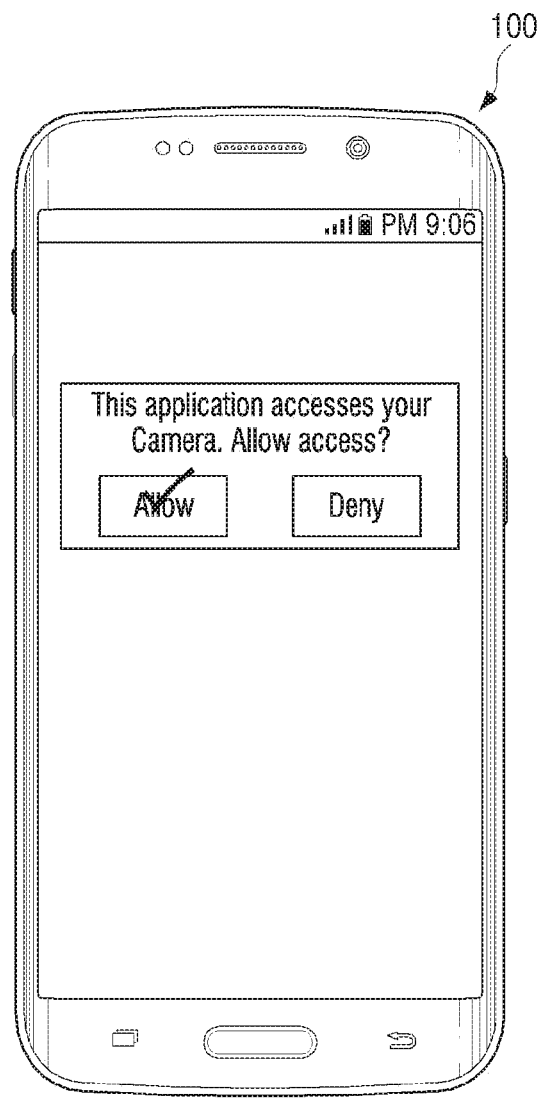
FIG. 1 is a view to describe an electronic device displaying a user interface (UI) for setting an access right of an application according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As embodiments may have a variety of modifications and several examples, certain embodiments will be exemplified in the drawings and described in detail in the description thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the disclosure, relational terms such as first and second, and the like, may be used to distinguish one entity from another entity, without necessarily implying any actual relationship or order between such entities. In embodiments of the disclosure, relational terms such as first and second, and the like, may be used to distinguish one entity from another entity, without necessarily implying any actual relationship or order between such entities.

The terms "include", "comprise", "is configured to," etc., of the description are used to indicate that there are features, numbers, operations, elements, parts or combination thereof, and they should not exclude the possibilities of combination or addition of one or more features, numbers, operations, elements, parts or a combination thereof.

According to embodiments, a "module" or "unit" performs at least one function or operation, and may be implemented as hardware or software, or a combination of hardware and software. In addition, a plurality of 'modules' or a plurality of 'units' may be integrated into at least one module and may be realized as at least one processor except for 'modules' or 'units' that should be realized in a specific hardware.

Meanwhile, when the specification states that one constituent element is "connected to" another constituent element, it includes a case in which the two constituent elements are 'connected to each other with another constituent element intervened therebetween' as well as a case in which the two constituent elements are 'directly connected to each other.' Further, when one constituent element "comprises (or includes)" another constituent element, unless specifically stated to the contrary, it refers to that another constituent elements may be further included rather than precluding the same.

Hereinbelow, certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

Also, in the embodiment of the disclosure, an "application" refers to a set of computer programs designed to perform a specific task. In the embodiments of this disclosure, the application may be varied. For example, the application may be a game application, a video playback application, a map application, a memo application, a calendar application, a phonebook application, a broadcasting application, an exercise support application, a payment application, a photo folder application, a medical device control application, and an application for providing a user interface for a plurality of medical devices but it is not limited thereto.

FIG. 1 is a view to describe an electronic device displaying a user interface (UI) for setting an access right of an application according to an embodiment of the disclosure.

Referring to FIG. 1, when a user uses a specific application and an application attempts to use a specific function of the electronic device in a state in which access to a specific function of the electronic device is blocked, the electronic device 100 may display a UI asking about setting an access right.

Here, when a user wishes to set an access right, a command for allowance can be input. For example, when the electronic device 100 is a smartphone, a user may touch the "allow" button on UI and set an access right for a specific function.

If the user does not want to set access rights in the same way, a deny command can be input. For example, if the electronic device 100 is a smartphone, the user may touch the "Deny" button displayed on the UI to set access rights for a particular function.

It is needless to say that the type of the user command may vary according to the type of the electronic device 100. For example, when the electronic device 100 is a display device, a user command may be input through an input through a remote control device, or a user command may be input through voice recognition, gesture detection, or the like.

At this time, if the access right of the application is denied, the electronic device 100 may not use a specific function of the application. Thereafter, when the application desires to use the previously denied access right again, the electronic device 100 may again display the UI inquiring about the access right setting.

If the access right of the application is allowed, the electronic device 100 can allow a specific function for the application so that the application can freely use the granted access right. However, when the state of the electronic device 100 or the application is changed, the electronic device 100 may again display the UI inquiring whether or not the access right of the application for the specific function is allowed according to the changed state. The status change may vary depending on whether the application operates in the foreground or in the background, the type of network connected to the electronic device 100, whether the electronic device 100 is on or off, and where the electronic device is located. This will be described later.

Figure 2:
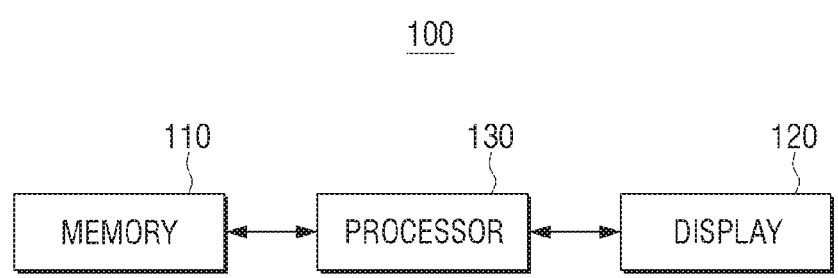
FIG. 2 is a block diagram briefly illustrating a configuration of an electronic device according to an embodiment of the disclosure.

FIG. 2 is a block diagram briefly illustrating a configuration of an electronic device according to an embodiment of the disclosure.

Referring to FIG. 2, the electronic device 100 includes a memory 110, a display 120, and a processor 130. At this time, the electronic device 100 may be implemented as a smartphone, but the disclosure is not limited to a smartphone, and may include at least one of a smartphone, a tablet personal computer, a mobile phone, a video phone, an e-book reader, a desktop PC, a laptop computer, a netbook computer, a workstation, a server, a personal digital assistant (PDA), a portable multimedia player (PMP), an MP3 player, a mobile medical device, a camera, or a wearable device. According to various embodiments, the wearable device may be of the type of accessory (e.g., a watch, a ring, a bracelet, a bracelet, a necklace, a glasses, a contact lens or a head-mounted-device (HMD)), a fabric or clothes (e.g., an electronic garment), a body attachment (e.g., a skin pad or tattoo), or a bio-implantable (e.g., implantable circuit).

In another embodiment, the electronic device 100 may be a home appliance. Home appliances may include at least one of, for example, televisions, digital versatile disc (DVD) players, audio, refrigerators, air conditioners, vacuum cleaners, ovens, microwaves, washing machines, air cleaners, set-top box, home automation control panel, a security control panel, a television TV box such as Samsung HomeSync™, Apple TV™ or Google TV™), a game console (e.g., Xbox™, PlayStation™), an e-dictionary, an electronic key, a camcorder, or an electronic photo frame.

In another embodiment, the electronic device 100 may include at least one of a variety of medical devices such as various portable medical measurement devices (a blood glucose meter, a heart rate meter, a blood pressure meter or a temperature measuring device, a magnetic resonance angiography (MRA), a magnetic resonance imaging (MRI), computed tomography (CT), a photographing device, or an ultrasonic device, etc.), a navigator, Global Navigation Satellite System (GNSS), an event data recorder (EDR), a flight data recorder (FDR), automotive infotainment devices, marine electronic equipment (e.g., marine navigation devices, gyro compasses, etc.), avionics, security devices, head units for the vehicle, industrial or home robots, automatic teller's machine (ATM), point of sales (POS) of a store, or internet of things (e.g., light bulbs, various sensors, electricity or gas meters, sprinkler devices, fire alarms, thermostats, street lights, a toaster, a fitness equipment, a hot water tank, a heater, a boiler, etc.).

In another embodiment, the electronic device 100 may include at least one of a piece of furniture or a part of a building/structure, an electronic board, an electronic signature receiving device, a projector, or various measuring devices (e.g., water, electricity, gas, or radio wave measuring instruments, etc.).

The memory 110 may store various programs and data necessary for the operation of the electronic device 100. The memory 110 may be implemented as a non-volatile memory, a volatile memory, a flash memory, a hard disk drive (HDD), or a solid state drive (SSD).

The memory 110 may store a mapping table for permission/denial of an access right corresponding to an application type, functions of the electronic device 100 necessary for executing a specific application, and a state of the electronic device 100 or application.

The display 120 may display various screens in a display area. For example, the display 120 may display a UI inquiring whether or not the access right of the application is permitted. The display 120 may display a notification bar window for providing various information to the user. Alternatively, the display 120 may display various screens such as an application execution screen and an application setting environment screen. In addition, the display 120 can display contents such as an image, a video, a text, and the like.

The processor 130 controls the overall operation of the electronic device 100. Specifically, when an event for inquiring whether or not the access right to the function of the electronic device 100 necessary for executing the application is detected, the processor 130 may control the display 120 to display a UI for confirming whether the access right is allowed or not. Here, the event for inquiring whether or not the access right is permitted may be a case where the state of the electronic device 100 or the application is changed when a specific function of the electronic device 100 is required to execute the application.

Here, when a user command is input through an UI to confirm whether the access right is allowed or not, the processor 130 may control the memory 110 to match and store whether the access right is allowed according to the status of an application and a user command based on the occurred event. To be specific, when a user command is a command for access right allowance, the processor 130, when an application executes a specific function, may control the electronic device 100 so that an application uses a specific function without displaying an access right inquiry UI. Alternatively, if a user command is a command for access right denial, the processor 130, when an application executes a specific function, may control the display 120 so that the access right inquiry UI can be displayed.

In the meantime, when an execution state of the electronic device 100 or the application is changed, the processor 130 may control the display 120 to display a UI inquiring whether the access right of the function corresponding to the application is allowed or not. Specifically, when the execution state of the application is changed, the processor 130, even if the access right to the specific function in a previous execution state is allowed, may control the display 120 to display again the UI inquiring whether the access right for the allowed function in a previous state would be allowed.

For example, even if a specific application is allowed to access the camera function while the display 120 is on, the access right to the camera function may be blocked when the screen of the display 120 is turned off. In this case, the processor 130 may control the display 120 to display a UI asking whether to allow access to the camera function in a state that the display 120 is turned off after the display 120 is turned back on.

In another example, if the application is allowed to access the camera function in the foreground state, if the execution state of the application is changed to the background state, the processor 130 may control the display 120 to display the inquiring UI about whether to allow access to the camera function. At this time, the foreground state means a state in which the user can directly operate the application, and the background state means a state in which the application cannot be directly operated by the user, but the application is being executed.

Meanwhile, when the application is changed from the foreground state to the background state, the processor 130 may control the display 120 to display the UI inquiring whether the access right of the allowed access rights has been permitted, but it is not limited thereto. For example, if an application is changed from a foreground state to a background state, the processor 130 may block the granted access rights, and if the application subsequently wants to use a particular function in the background state, the display 120 may be controlled to display a UI inquiring about whether the access right to a specific function would be allowed.

Meanwhile, the processor 130 may control the memory 110 to match and store the access right of the function and function corresponding to the background state when the application is changed from the foreground to the background state. If the access right to the specific function is stored so as to be allowed in the background state, the processor 130 may not display the UI for granting access permission to the allowed function. That is, when the application is in the background state, the processor 130 may control the application to operate in accordance with the stored access right in the background state.

Meanwhile, the state of the on-off/foreground-background of the display 120 described above is only one embodiment of the disclosure, but the disclosure is not limited thereto. The processor 130 may store in the memory 110 whether to grant access to various functions according to the state of the various electronic devices 100 or the application as well as the status of the electronic device 100 or the application. The processor 130 may also store various access permissions according to various combinations of states.

For example, when the application operates in the background state and the battery of the electronic device 100 is less than a preset value, the processor 130 may block the access right of the function corresponding to the application.

If an application is not executed for a preset time, the processor 130 may block the access right of the corresponding function of the application.

Alternatively, when an electronic device is connected to a preset network, the processor 130 may allow the access right to the network function corresponding to the application.

Meanwhile, when an event related to the execution of the specific function occurs, the processor 130 can determine whether or not the access right to the specific function is allowed. Specifically, the determination of the acceptability may be made based on a matching table stored in the memory 110.

At this time, if the access right to the execution of the specific function is not allowed, the processor 130 may control the display 120 to display a UI for confirming whether or not to allow the access right to the specific function. That is, the processor 130 may control the display 120 to display a UI for confirming whether or not the access right is allowed only when the application wants to execute the function whose access right is blocked.

When the application is executed for the first time, the processor 130 may control the display 120 to display a UI inquiring whether the right which is temporarily required for rights for running a foreground and rights and authentication for running a background is allowed. In other words, the processor 130 may control the display 120 to display a UI inquiring about whether or not the access right is allowed when the application is initially executed for the frequently changed state.

At this time, if the specific function corresponding to the application is a temporarily required function for authentication, the processor 130 may block the access right to the function necessary for authentication when the authentication is completed. That is, even if a user command that allows an access right is input for a temporarily required function, the processor 130 can temporarily block the access right to a necessary function without displaying the UI for the permission authority.

Figure 3A:
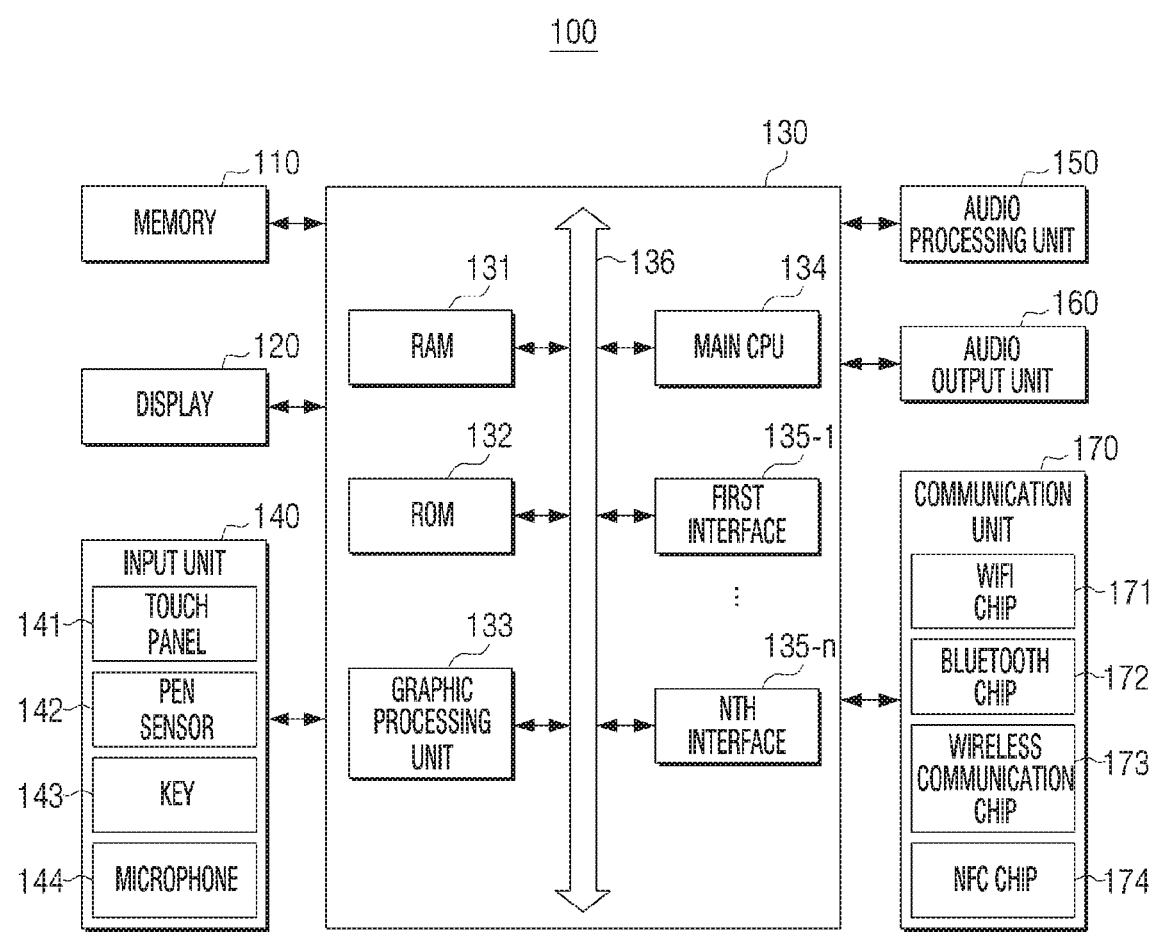
FIG. 3A is a block diagram illustrating a configuration of an electronic device in detail according to an embodiment of the disclosure.

FIG. 3A is a block diagram showing the detailed configuration of an electronic device according to an embodiment of the disclosure of the disclosure.

Referring to FIG. 3A, the electronic device 100 may further include an input unit 140 (e.g., an input interface), an audio processing unit 150 (e.g., an audio processor), an audio output unit 160 (e.g., an audio output device or speaker), and a communication unit 170 (e.g., a communication circuit or transceiver), in addition to the memory 110, the display 120. However, the disclosure is not limited to the above-described configuration, and it goes without saying that some components may be added or omitted as needed.

The memory 110, as described above, may store various programs and data necessary for operations of the electronic device 100. Here, the memory 110 may include a hard disk, memory, cache and register.

The display 120 can display various screens as described above. At this time, the display 120 may be implemented as various types of display panels. For example, the display panel may be implemented with various display technologies such as a liquid crystal display (LCD), an organic light emitting diode (OLED), an active matrix organic light-emitting diode (AM-OLED), a liquid crystal on silicon (LcoS), or digital light processing (DLP).

The display 120 may also be coupled to at least one of a front area, a side area, and a rear area of the electronic device 100 in the form of a flexible display. The flexible display can be a display that can bend or roll without damage through a thin, flexible substrate such as paper. Such a flexible display may be manufactured using a plastic substrate as well as a commonly used glass substrate. If a plastic substrate is used, it can be formed using a low temperature manufacturing processor without using a conventional manufacturing processor to prevent damage to the substrate. Further, the glass substrate wrapping the flexible liquid crystal can be replaced with a plastic film to give flexibility to fold and unfold. Such a flexible display is advantageous not only in thickness and lightness but also is shock-resistant, and can be bent or rolled, and can be manufactured in various forms.

The input unit 140 may include a touch panel 141, a pen sensor 142, a key 143, and a microphone 144 to receive various inputs. The touch panel 141 may be configured by combining the display 120 and a touch sensor (not shown), and the touch sensor may employ at least one of an electrostatic type, a pressure sensitive type, an infrared type, and an ultrasonic type. The touch panel not only has a display function but also a function of detecting a touch input position and a touch area as well as a touch input pressure and has a function of detecting not only a real touch but also a proximity touch. The pen sensor 142 may be implemented as part of the touch panel 141 or may include a separate identification sheet. The key 143 may comprise a physical button, an optical key or a keypad. The microphone 144 may include at least one of an internal microphone or an external microphone.

In particular, the input unit 140 may receive an external command from the various configurations described above and transmit the received external command to the processor 130. The processor 130 may generate a control signal corresponding to the received input to control the electronic device 100.

The audio processing unit 150 is a component that performs processing on audio data. In the audio processing unit 150, various processes such as decoding and amplification of audio data, noise filtering, and the like may be performed. The audio data processed in the audio processing unit 150 may be output to the audio output unit 160.

The audio output unit 160 outputs various kinds of audio data, such as decoding, amplification, and noise filtering, as well as various kinds of notification sounds and voice messages, by the audio processing unit 150. In particular, the audio output unit 160 may be implemented as a speaker, but it may be implemented as an output terminal capable of outputting audio data.

The communication unit 170 can perform communication with an external device. In particular, the communication unit 170 may include various communication chips such as a Wi-Fi chip 171, a Bluetooth chip 172, a wireless communication chip 173, a near field communication (NFC) chip 174, and the like. At this time, the Wi-Fi (or WiFi) chip 171, the Bluetooth chip 172, and the NFC chip 174 communicate with each other using a LAN method, a Wi-Fi method, a Bluetooth method, and an NFC method. When the Wi-Fi chip 171 or the Bluetooth chip 172 is used, various connection information such as an SSID and a session key may be transmitted and received first, and communication information may be used to transmit and receive various information. The wireless communication chip 173 is a chip that performs communication according to various communication standards such as IEEE, ZigBee, 3G (3rd Generation), 3rd Generation Partnership Project (3GPP), and long term evolution (LTE), or the like.

The processor 130 may control overall operations of the electronic device 100 using various programs stored in the memory 110.

The processor 130 may include a RANI 131, a ROM 132, a graphics (or graphic) processing unit 133, a main central processing unit (CPU) 134, first to n interfaces 135-1 to 135-n, and a bus 136. The RANI 131, the ROM 132, the graphics processing unit 133, the main CPU 134, the first through n interfaces 135-1 through 135-n, etc. may be connected to each other via the bus 136.

The RAM 131 stores the operating system (O/S) and the application program. To be specific, when the electronic device 100 is booted, the O/S is stored in the RAM 131, and various application data selected by the user may be stored in the RAM 131.

The ROM 132 stores a command set for booting the system and the like. When the turn-on command is input and power is supplied, the main CPU 134 copies the O/S stored in the memory 110 to the RAM 131 according to the instruction stored in the ROM 132, executes the O/S to boot the system. When the booting is completed, the main CPU 134 copies various application programs stored in the memory 110 to the RAM 131, executes the application program copied to the RAM 131, and performs various operations.

The graphics processing unit 133 generates a screen including various objects such as an item, an image, and a text using an operation unit (not shown) and a rendering unit (not shown). Here, the operation unit may be configured to calculate an attribute value such as a coordinate value, a shape, a size, and a color to be displayed by each object according to the layout of the screen using the control command received from the input unit 140. The rendering unit may be configured to generate screens of various layouts including objects based on the attribute values calculated by the operation unit. The screen generated by this rendering unit may be displayed within the display area of the display 120.

The main CPU 134 accesses the memory 110 and performs booting using the O/S stored in the memory 110. The main CPU 134 performs various operations using various programs, contents, and data stored in the memory 110.

The first to n$^{th}$ interfaces 135-1 to 135-n are connected to the various components described above. One of the first to n interfaces 135-1 to 135-n may be a network interface connected to an external device via a network.

Figure 3B:
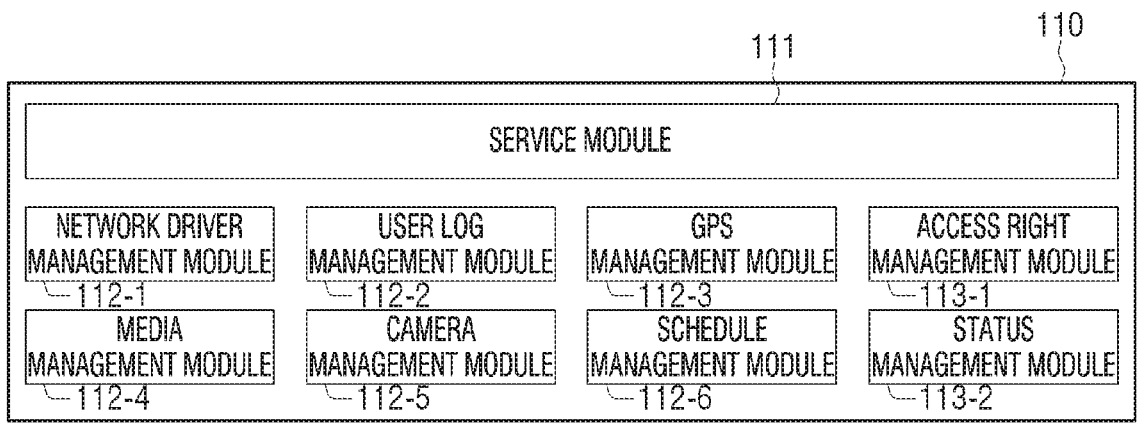
FIG. 3B is a block diagram illustrating a configuration of a memory in detail according to an embodiment of the disclosure.

FIG. 3B is a block diagram illustrating a configuration of a memory in detail according to an embodiment of the disclosure.

Referring to FIG. 3B, the memory 110 may include various modules. That is, the memory 110 may further include a service module 111, a network driver management module 112-1, a user log management module 112-2, a GPS management module 112-3, a media management module 112-4, a camera management module 112-5, a schedule management module 112-6, an access right management module 113-1, and a status management module 113-2 (e.g., a status detection module).

Each module can store various information. For example, the network driver management module 112-1 may store information about the network, the user log management module 112-2 may store information about the log about using the electronic device 100, the GPS management module 112-3 may store information about the GPS, the media management module 112-4 may store information on various media stored in the memory 110, the camera management module 112-5 may store information on camera, and the schedule management module 112-6 may store information on a schedule. At this point, the various modules described above may be accessed by the processor 130.

The access right management module 113-1 may store access right information according to the execution state of the electronic device 100 or the application and the function of the electronic device 100 corresponding to the application. To be specific, the access right management module 113-1 stores an access right policy according to the user's agreement. That is, when a user command for granting or denying the access right is inputted through the UI inquiring about the permission or denial of the access right, the access right management module 113-1 matches the state of the application and the permission of the access right according to the user command and store the same. At this time, the access right management module 113-1 may store information on the state condition of the application. The state condition information of the application is information on the state condition of various applications or the electronic device 100, and can be configured as a combination of one or more state conditions. Here, the status condition information of various applications can be managed through the status ID.

Specifically, the state condition of the application can be determined by various methods. For example, the state condition of the application may be information on a network to which the electronic device 100 is connected, a connected device, or position of the electronic device 100.

Alternatively, the status condition of the application may be an execution status of the application, wherein the execution status of the application may include a condition such as an application running in the background, an application running in the foreground, and a state where the application is stopped, and the like. As described above, the foreground state means a state in which a user can operate the application directly, and the background state means a state in which the application operates but the user cannot operate the application.

Alternatively, the status condition of an application may be a condition about the on-off state of the display 120 of the electronic device 100.

The state condition of an application may be a condition for the network state to which the electronic device 100 is connected. For example, the state condition of the application may be a state condition (hereinafter referred to as a private network state condition) in which an application is operating in a safe network environment registered by the user or a status condition (hereinafter referred to as a public network state condition) which is operating in an unauthorized network environment.

Alternatively, the status condition of the application may be a condition for the location of the electronic device 100. For example, the state condition of the application may be a state condition (hereinafter referred to as a private space state condition) in which the application is executed in a secure place (e.g., home or office) where the electronic device 100 is registered by the user, or a status condition (hereinafter referred to as a public space state condition) in which an application is executed in an unauthorized public place (for example, a cafe or a subway station, etc.).

Alternatively, the application state condition may be a state condition depending on whether or not the security application is being executed. For example, the application state condition may be a state condition in which an application is running under a state in which a secure (other) application (e.g., a security application, a vaccine application, etc.) is operating (hereinafter safe-APP environment state condition) or a state condition in which the application is running in a state in which the above-described application is not executed (hereinafter referred to as a non-safe-APP environment state condition).

Alternatively, the state condition of the application may be a state condition for the data/battery usage of the application. For example, the application state condition may be a condition for the electronic device 100 when the data or the battery is reduced by a predetermined value while the application is being executed, or when the application uses the data or the battery by a predetermined value. For example, the application state condition may be a first state condition when the battery of the electronic device 100 is equal to or greater than a predetermined value (for example, 15%), or a second state condition if less than a predetermined value. Alternatively, application state condition may be a first state condition if the battery usage of the electronic device 100 used by the application is greater than or equal to a predetermined value (e.g., 10%), or a second state condition if less than a predetermined value. The state condition for the data may also be determined by the above.

Alternatively, the state condition of the application may be a state condition for the execution time of the application. For example, the application state condition may be a first state condition when the application is running for a predetermined time (e.g., 30 minutes) or a second state condition if the application is executed for less than a predetermined time.

The status condition of an application may be a condition for final execution time of an application. For example, the condition in which a predetermined time (for example, 3 days) has not passed from the final execution of the application can be the first status condition, and the condition in which the predetermined time has passed can be the second status condition.

The status condition of an application may be status information on the number of approaching to a function of the electronic device 100 which requires access right, or the status information on the final approach time, etc.

Alternatively, the state condition of the application may be a condition according to the execution state change of the application. For example, a state in which an application is changed from a foreground state to a background state, a state in which the display 120 is turned off in a foreground state, a state in which the display 120 is turned on in a state in which the display 120 is turned off, a state in which the display 120 is changed from the off state to a foreground state, and a state in which the display 120 is changed from the off state to the background state, and so on. Although the case where the state change according to the above-described embodiment refers to a case in which a state is changed from one state to another state has been described, it is not limited thereto. That is, it may be determined that one state condition is that the state changes from the first state to the second state and then changes to the third state. In addition, in the above-described embodiment, the state change condition is described by the combination of the on-off state of the display 120 and the foreground-background states. However, it goes without saying that the state condition can be set by a combination of various state conditions.

Meanwhile, the various application state conditions described above can be stored in the access right management module 113-1. The processor 130 may define the execution state of the application by combining the various application state conditions described above. The processor 130 may add and manage a status ID to the defined application execution state. That is, as shown in Table 1 below, the access right management module 113-1 may store a status ID table corresponding to a combination of various state conditions.

TABLE 1

| Status ID | Focus | Screen | Network | Location | App Dependency |
|---|---|---|---|---|---|
| 001 | F | ON | Private | Private | Safe |
| 002 | FB | ON | Private | Private | Safe |
| 003 | B | ON | Private | Private | Safe |
| 004 | F | ON | Public | Private | Non-safe |
| 005 | FB | ON | Public | Private | Non-safe |
| 006 | B | ON | Public | Private | Non-safe |
| 007 | F | ON | Private | Private | Non-safe |
| 008 | FB | OFF | Private | Public | Non-safe |
| 009 | B | OFF | Private | Public | Non-safe |
| 010 | F | OFF | Private | Public | Non-safe |
| ... | ... | ... | ... | ... | ... |

Herein, the status ID can be generated in advance and present, but this is not limited thereto. That is, the status ID table can be directly input by a user.

Alternatively, the status ID table may be determined according to the number of times that various state conditions are detected, time, and the like. For example, it may be assumed that the above-described various status information is stored in the access right management module 113-1. For example, when the first application is executed, the first application may be executed most (or the longest) among the various state conditions described above under the specific state condition. That is, the processor 130 may directly generate a status ID table suitable for the first application, based on the accumulated usage data and the various state conditions of the first application.

The state management module 113-2 is a module for detecting the status ID of the application stored in the access right management module 113-1. The processor 130 may control the state management module 113-2 to determine whether the status ID of the application is changed or not. At this time, if the state of the application is changed, the processor 130 determines whether the functions corresponding to the corresponding status ID are permitted or denied by using the access right management module 113-1, and if necessary, the processor may control the display to display the UI for inquiring whether access right to specific functions is allowed.

FIGS. 4A and 4B are views to describe an access right management table according to various embodiments of the disclosure.

In the past, access right which matches the types of an application and functions of the electronic device 100 executed by an application is stored as a table, and the electronic device 100 determines whether to execute a specific function according to a stored table.

Referring to FIG. 4A, an application A can allow a camera function and Internet function, and deny an access right to a voice recording function. In this case, when the application A wishes to use the camera function and the Internet function, the function can always be used irrespective of the application state, and the voice recognition function cannot always be used regardless of the state of the application.

However, the electronic device 100 according to the disclosure may have a different access right to a specific function depending on the state of an application.

Referring to FIG. 4B, when the status ID is 1, the application A sets the camera function access right to "allow" and when the status ID is 2 for the camera function, the camera function access right can be set to "deny". If the status ID is 1, 2, or 4 for the Internet function, the application A sets the Internet function access right to "allow", and if the status ID is 3 for the Internet function is 3, the Internet function access right can be set to "deny." Application A also sets the access right to the sound recording function to "deny" when the status ID is 1 for the voice recording function, and the access right can be set to "allow" when the status ID is 2 for the voice recording function.

Here, the status ID table related to the status ID is as illustrated in Table 1 above.

In the aforementioned embodiments, it has been described the access right management table on application A, but a table having independent access rights for various applications can be present.

The access right matching the application type, the function of the electronic device 100, and the status ID is not fixed but can be changed according to various methods. For example, when the status ID is changed for the same application or when the status ID is changed for the same application and the function of the electronic device 100, the electronic device 100 may determine whether the access right changes according to the status ID change. If it is determined that the access right is changed, the electronic device 100 can notify that the access right has been changed, and at the same time, can display a UI inquiring whether or not to grant the access right. At this time, when the user command is input, the electronic device 100 can change whether or not the access right of the access right management table is permitted according to the input user command.

In addition, the electronic device 100 may display an access right setting UI according to a user command, and if a user command is input through the displayed access right setting UI, may change the access right permission according to the user command.

FIGS. 5A to 5D are views to describe a method for setting an access right according to various embodiments of the disclosure.

Figure 5A:
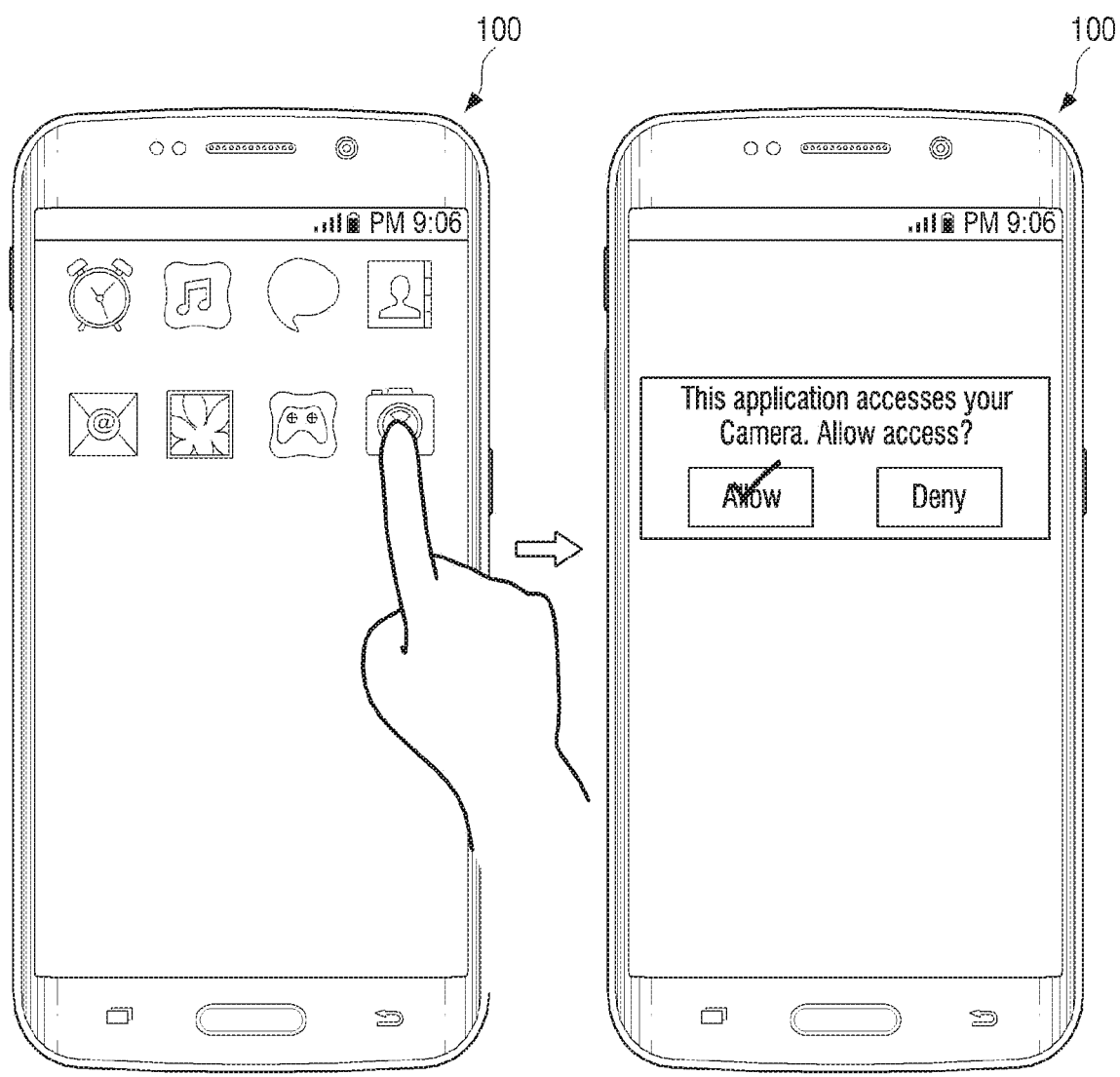
FIGS. 5A, 5B, 5C, and 5D are views to describe a method for setting an access right according to various embodiments of the disclosure.

Referring to FIG. 5A, a user can input a user command for executing a camera application. At this time, it can be assumed that the camera application is executed first after installing the application. When the application is initially executed, all functions of the electronic device 100 and the access right according to the status ID may be in the "deny" state. At this time, when the user desires to use the photo shooting function, the electronic device 100 can determine setting of the access right according to types of application (camera application), the function (camera function) of the electronic device 100 and the status ID (status ID=1). Here, the status ID may be various status IDs as shown in Table 1, but for the convenience of description, it is assumed that the status ID 1 includes only the foreground state conditions.

When the camera application is executed for the first time, the access right to all status IDs of the camera function is set to "deny", so the user cannot use the camera function. Accordingly, the electronic device 100 can display a UI inquiring whether to allow access to the camera function, as shown in FIG. 5A.

Here, when a user command to allow the access right is input through the UI, the electronic device may change and store the access right to the camera application/camera function/status ID 1 to "allow".

Figure 5B:
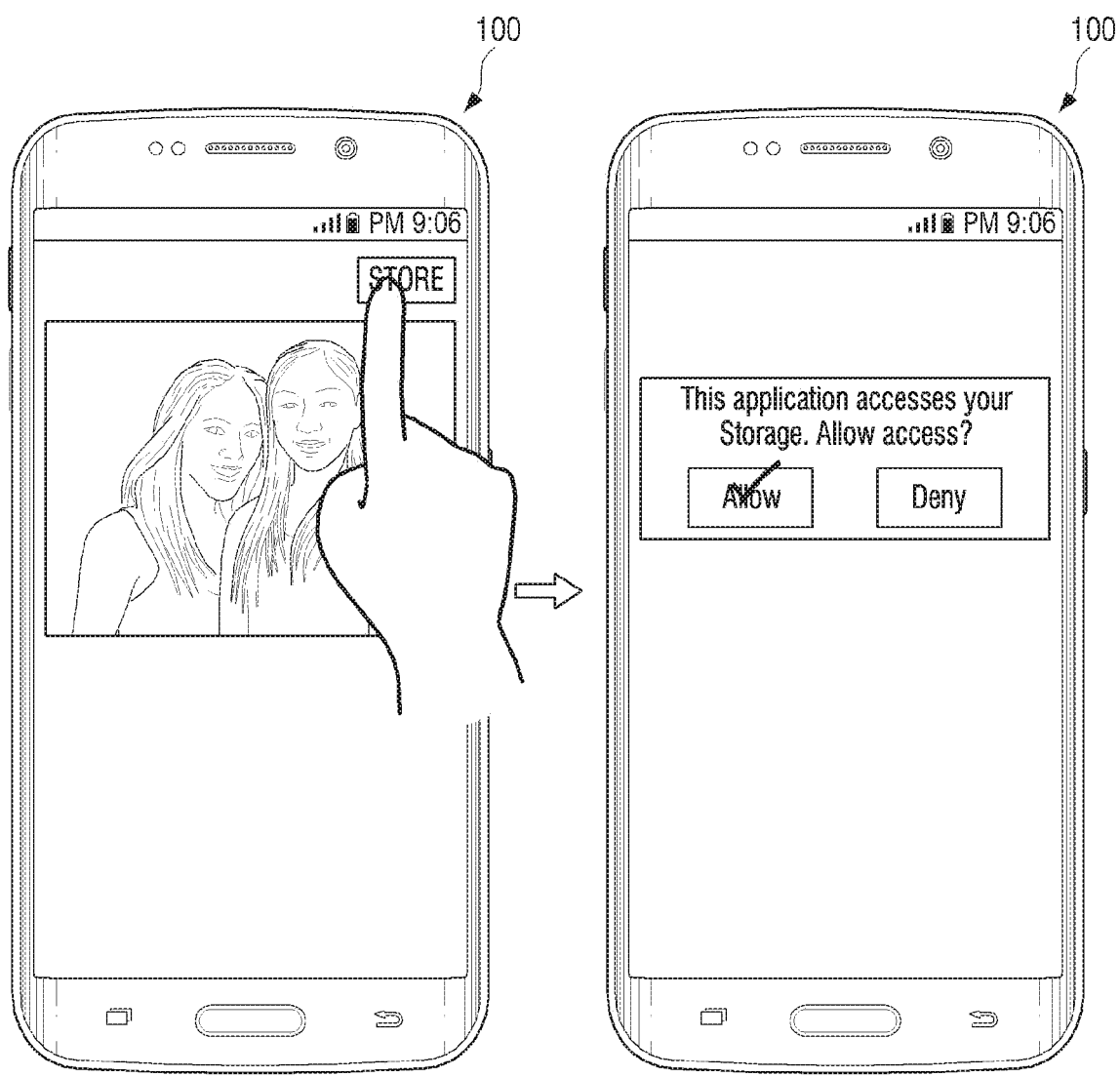

Referring to FIG. 5B, when a user completes photo shooting and stores a photo, the electronic device 100 may determine access right setting according to application types (camera application), function (storing function) of the electronic device 100, and status ID (status ID=1).

When the camera application is executed for the first time, since the access right to all status IDs of the storage function is set to "deny", the user cannot use the storage function. Thus, the electronic device 100 may display a UI inquiring whether to allow access to the storage function, as shown in FIG. 5B.

At this time, when a user command to allow the access right through the UI is input, the electronic device may change and store the access right to camera application/storing function/status ID 1 to "allow."

Figure 5C:
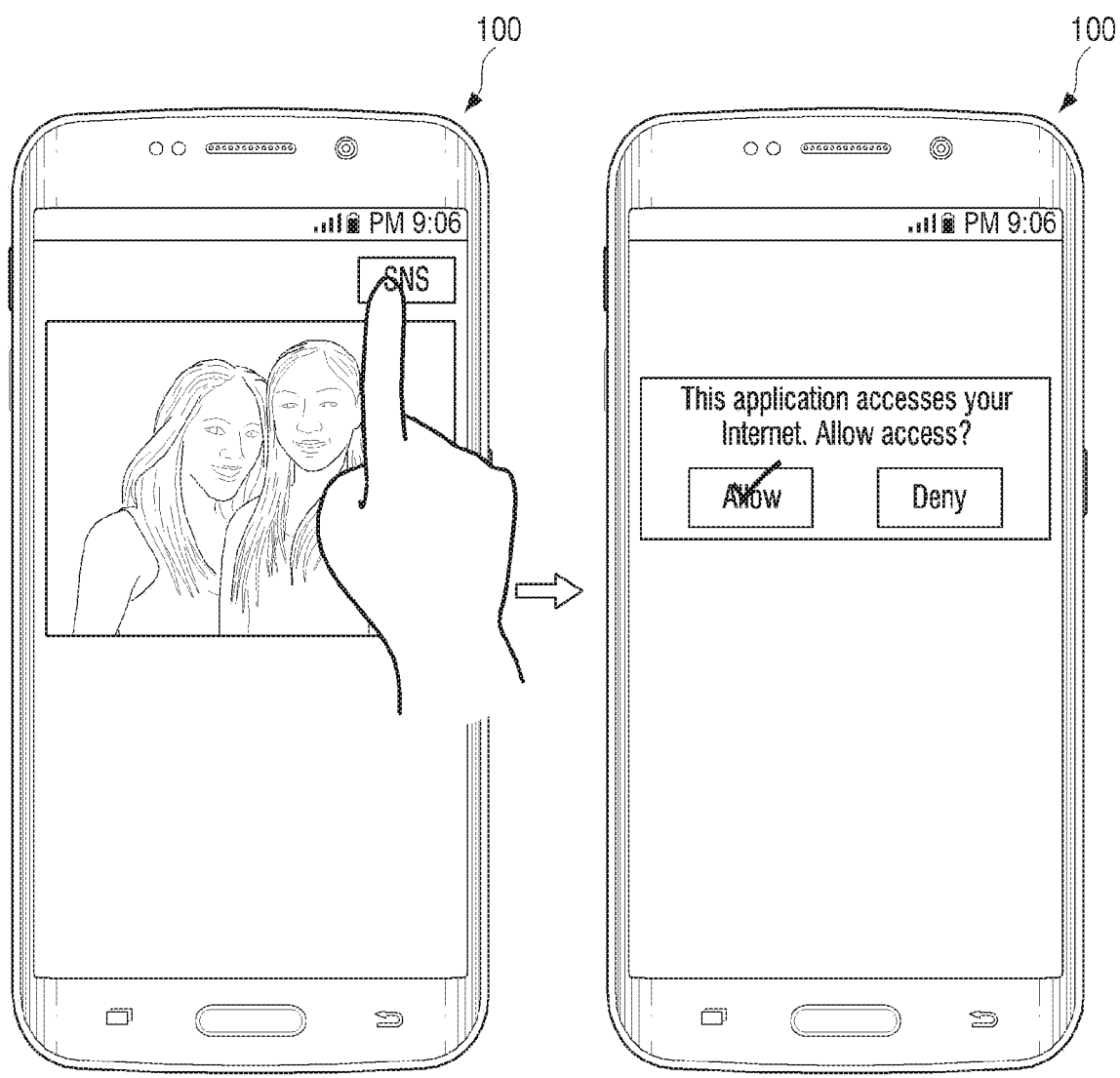

Referring to FIG. 5C, when a user completes photo saving and uploads the stored photo to SNS account, the electronic device 100 may determine access authority according to a type of applications (camera application), function (Internet function) of the electronic device 100 and the status ID (status ID=1).

When the camera application is executed for the first time, the access right to all status IDs of the Internet function is set to "deny", so the user cannot use the Internet function. Thus, the electronic device 100 may display a UI inquiring whether to allow access to Internet functions, as shown in FIG. 5C.

When a user command to allow access right is input through the UI, the electronic device may change and store the access right to the camera application/Internet function/status ID 1 to "allow".

That is, as FIGS. 5A to 5C, the camera application A may freely use a camera function, a storage function, and Internet function in the condition of status ID 1.

When a user command (for example, an input for pushing a home button of the electronic device 100) is inputted to cause the camera application to be executed in the background state, the electronic device 100 may determine access right which is changed according to a changed status ID (change from status ID to status ID 2). For example, as shown in FIG. 5D, the electronic device 100 may determine that the access right to the Internet function is changed (allowed to deny) according to the change of the status ID, and can display UI to inquire whether permission is granted.

Here, when a user command to allow the access right through the UI is input, the electronic device may change and store the access right to the camera application/Internet function/status ID 2 to "allow".

Figure 5D:
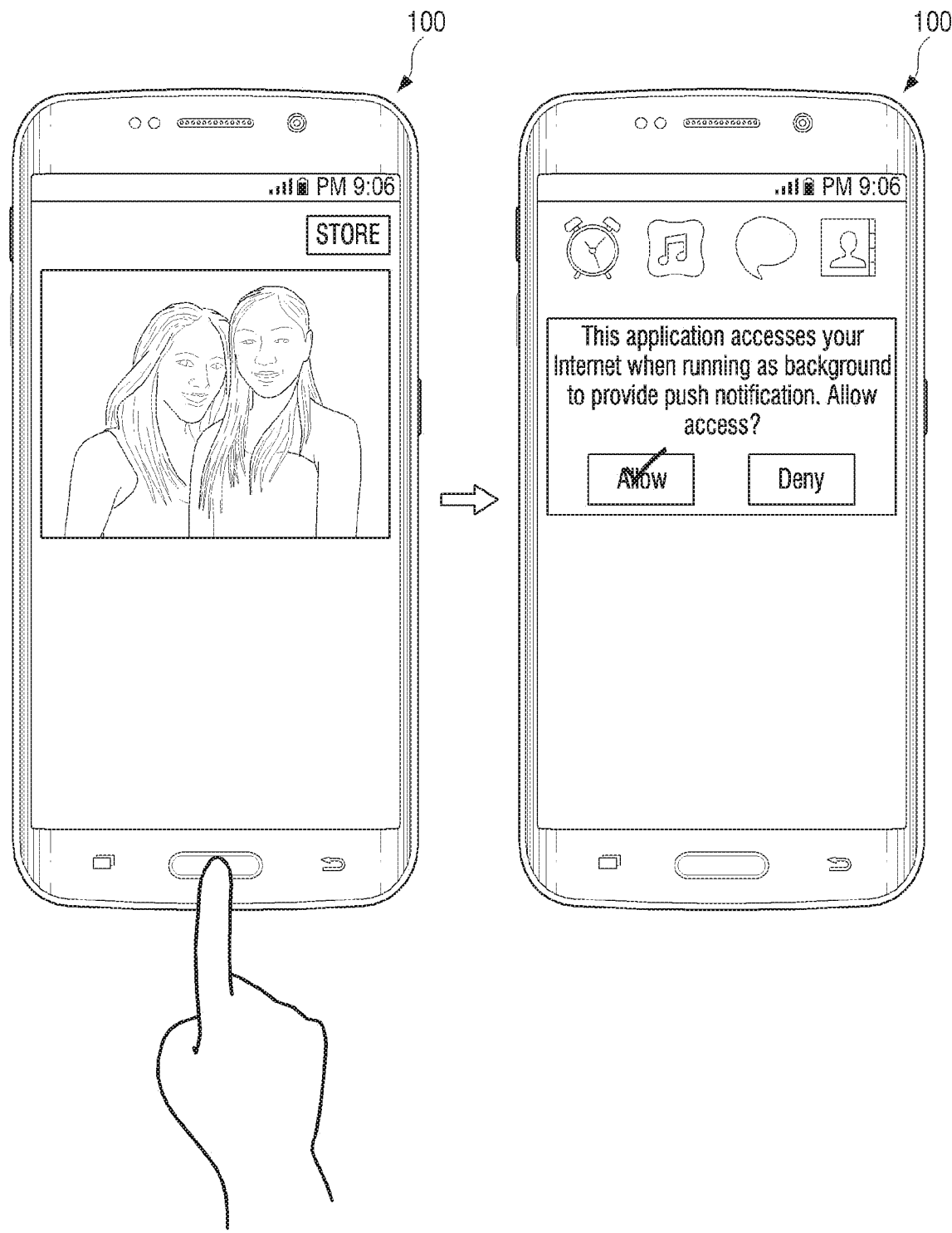

Though not illustrated in FIG. 5D, a same type of UI is displayed for a camera function and a storage function, and a user may select allow/deny for each function.

Figure 6A:
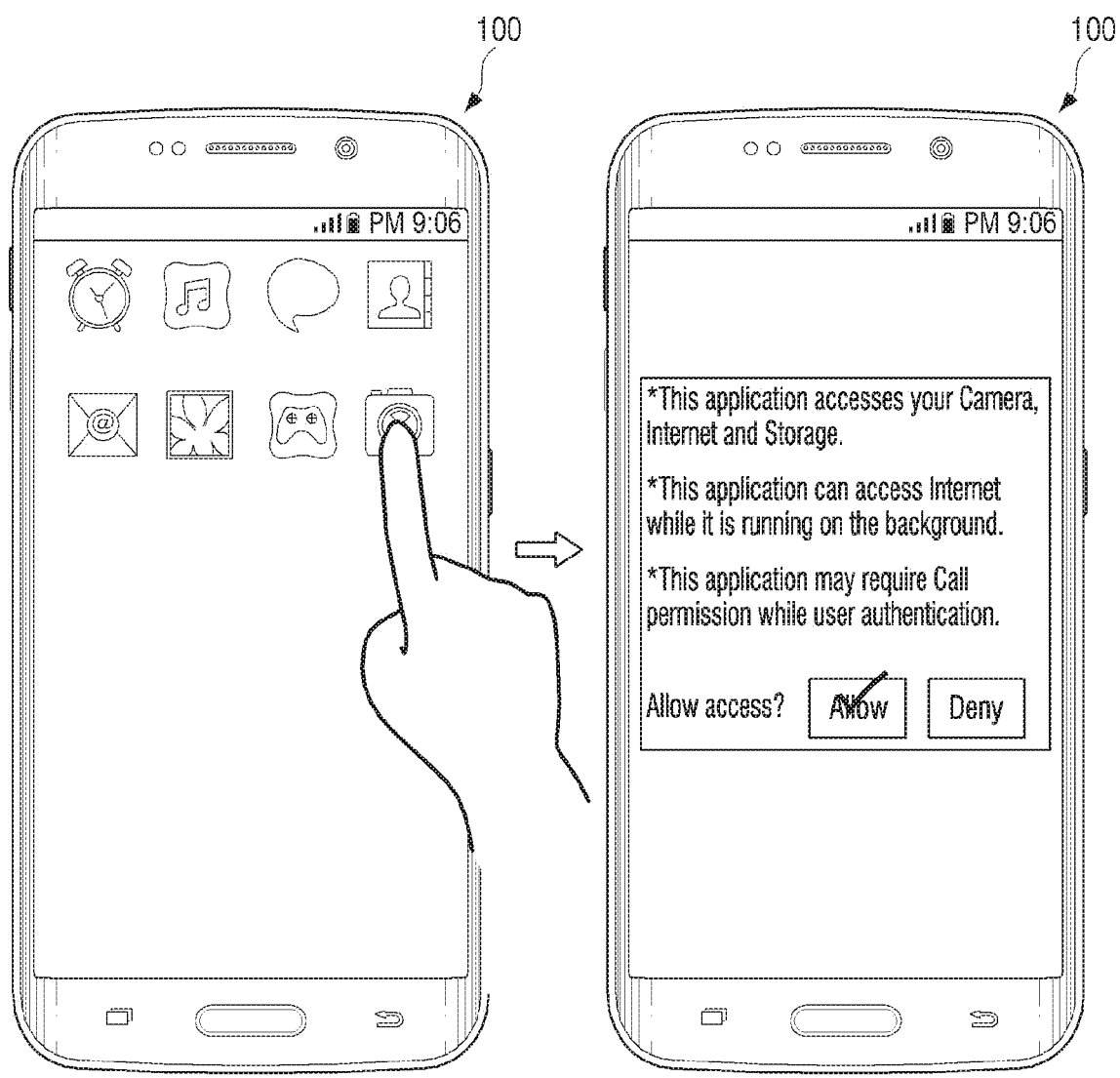
FIGS. 6A, 6B, 6C, 7A, and 7B are views to describe a UI for inquiring whether to allow various access rights according to various embodiments of the disclosure.
Figure 6B:
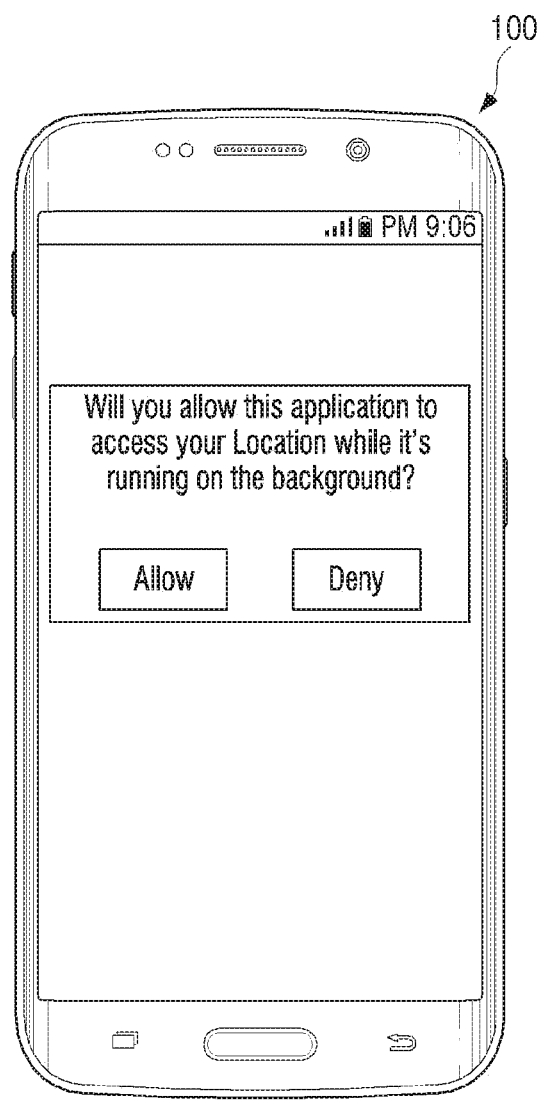
Figure 6C:
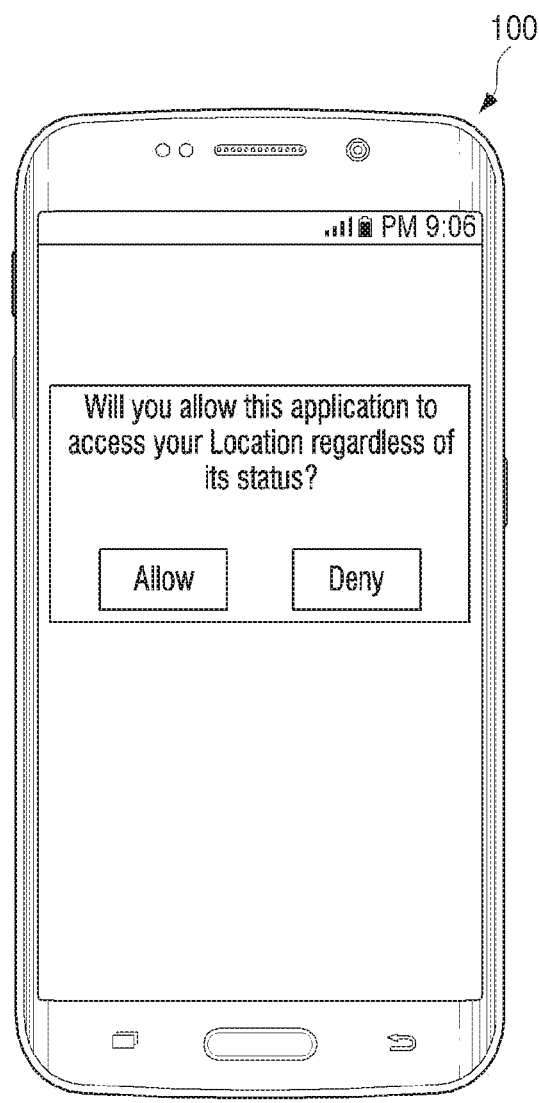

FIGS. 6A to 6C are views to describe a UI for inquiring whether to allow various access rights according to various embodiments of the disclosure.

To be specific, it has been described in FIGS. 5A to 5D that the electronic device 100 displays a UI inquiring access right permission to a specific function according to an event of running a specific function by the electronic device 100 and an event of changing a status ID, but it is not limited thereto.

Referring to FIG. 6A, when the camera application is initially executed, the electronic device 100 can display a UI about permission of access to functions used in the camera application at a time. At this time, the electronic device 100 may display a UI inquiring whether or not to permit access according to various status IDs.

To be specific, as illustrated in FIG. 6A, when a camera application is initially running, the UI displayed by the electronic device 100 may inquire about 1) whether to allow a camera function, Internet function, and storage function, 2)

whether to allow Internet function in a background state, and 3) whether to allow a call function for user authentication at a time.

Alternatively, the electronic device 100 may display a UI inquiring whether or not to set an access right for a specific function each time the status ID is changed.

Referring to FIG. 6B, the electronic device 100 may display a UI inquiring whether to allow access to the location function if the application changes in the foreground in the background.

Alternatively, the electronic device 100 may display a UI inquiring whether permission for access to a specific function is permitted in a plurality of status IDs.

Referring to FIG. 6C, the electronic device 100 may display a UI inquiring whether to allow access to the location function regardless of the status ID.

In the meantime, FIGS. 5A to 6C describe a case where access right is set through a UI to ask whether to allow an access right, but the disclosure is not limited thereto. That is, the electronic device 100 may change access right setting to a specific function through a UI for setting of an application.

Figure 7A:
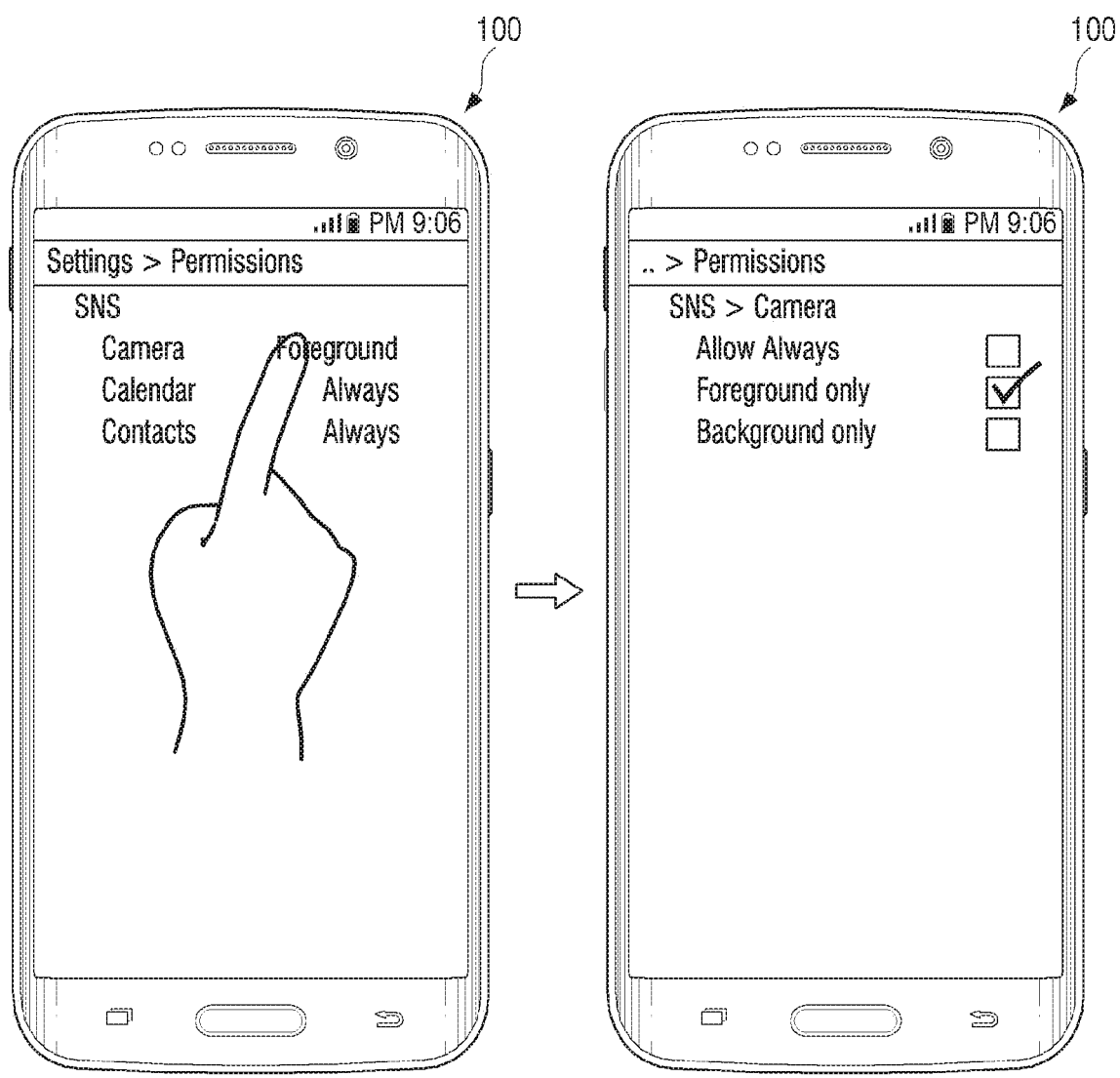
Figure 7B:
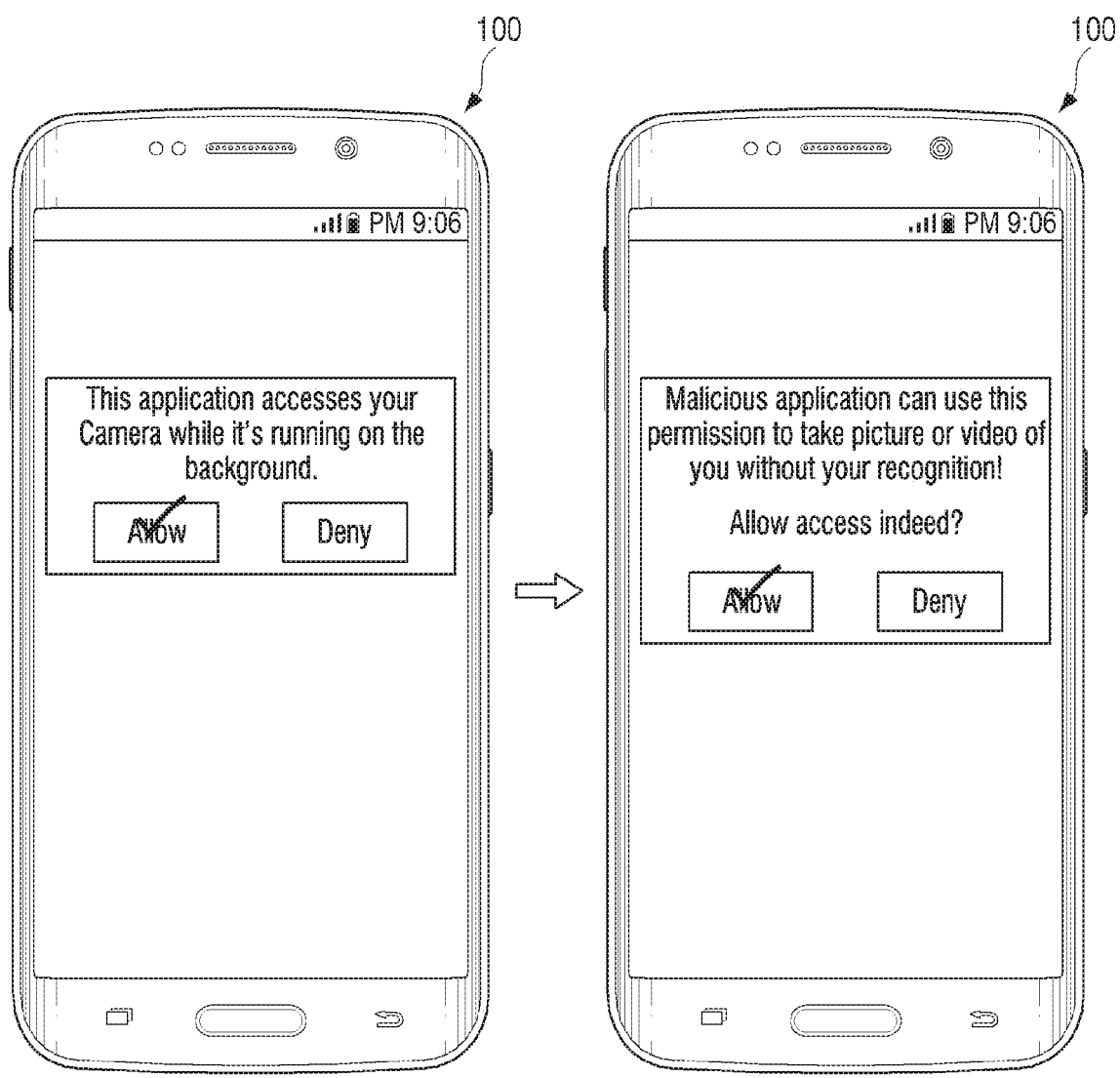

FIGS. 7A to 7C illustrate a UI for inquiring whether to allow various access rights according to various embodiments of the disclosure.

Specifically, as shown in FIG. 7A, the electronic device 100 can display a setting UI for setting access rights for each application. As shown on the left side of FIG. 7A, the electronic device 100 may display a setting UI screen displaying a UI providing a list of functions executed in the SNS. At this time, if the user command for changing the access right of the camera function (for example, a user command for touching the foreground area on the right side of the camera function list as shown in the left side of FIG. 7A) is input, the electronic device 100 may display a UI screen that allows to change the camera's access rights. Specifically, as shown in the right side of FIG. 7A, the setting UI may include an element that can always allow access to camera functions, allow in foreground, or allow in the background only. However, the disclosure is not limited to the above-described elements, and the elements displayed in the setting UI may vary depending on the application end, the type of status ID, system setting, and the like.

In the meantime, the processor 130 can control the application to always deny the access right to the specific function when the specific application has the specific status ID. However, even in this case, it is needless to say that the access right to a specific function can be allowed through a user command.

For example, the processor 130 may be configured such that the SNS application always denies access to the camera function in the background state. As illustrated in FIG. 7B, when a user command for permitting the access right to the camera function is input regardless of the status ID, the electronic device 100 may display a UI inquiring whether to allow the access right to a camera function in a background state. At this time, if a user command for allowing the access right of the camera function is input in the background state, the electronic device 100 may display a UI including a warning message that security problems may occur when the access right of the camera function is allowed in the background state. At this time, if a user command that allows the access right of the camera function in the background state is inputted through the UI including the warning message, the electronic device 100 can always allow the access right to the camera function of the SNS application.

That is, if it is set to deny access right to a specific function in a specific status ID due to security or other reasons, the electronic device 100 may display a UI inquiring whether to display an access right to a specific function for a plurality of times, so that a user can determine once again whether to set an access right to a specific function in a specific status ID.

Hereinafter, various embodiments according to an embodiment will be described based on FIGS. 8A to 11C.

Figure 8A:
Figure 8B:
Figure 8C:
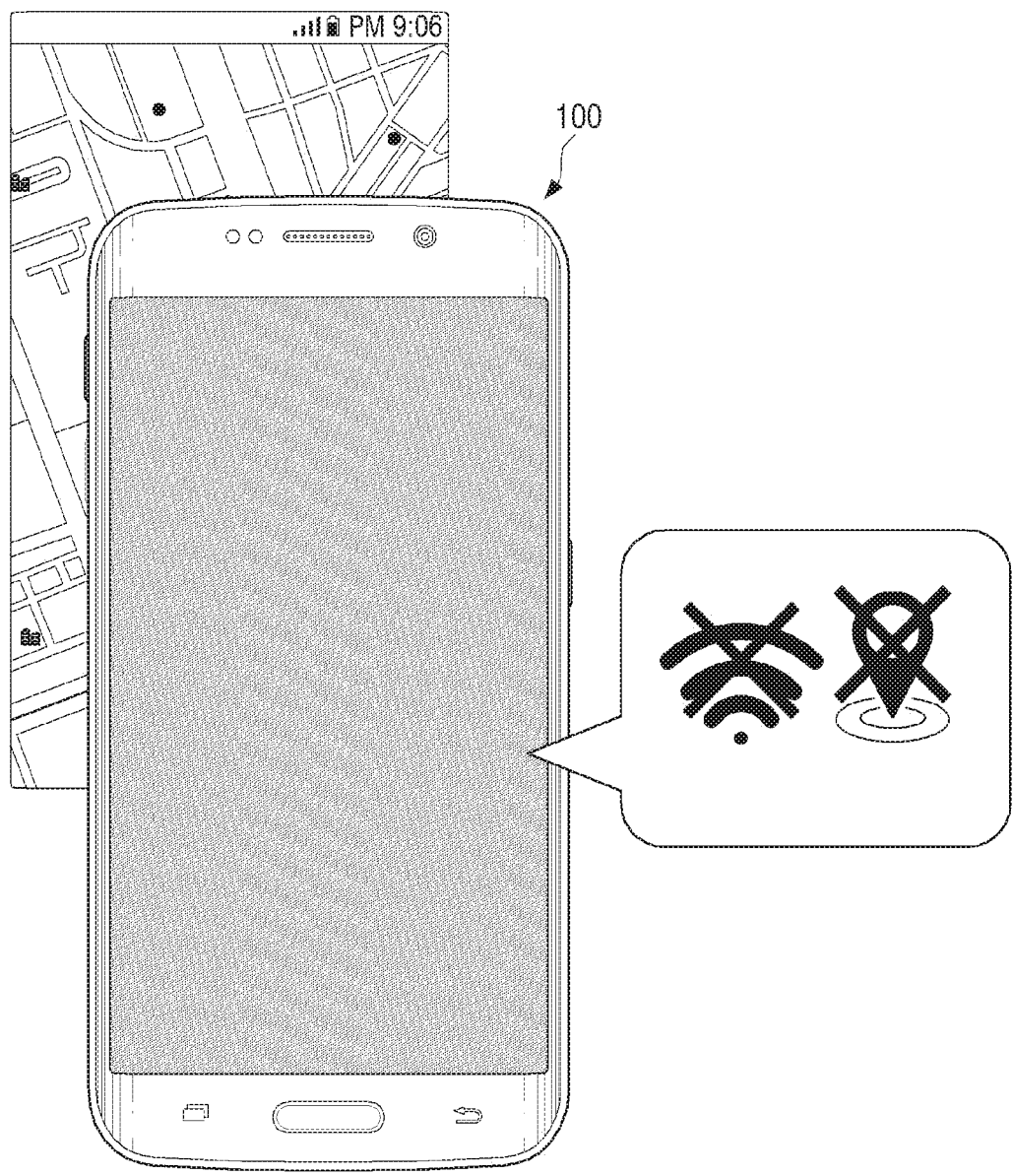

FIGS. 8A to 8C are views to describe a case of using a navigator or a map application according to various embodiments of the disclosure.

Referring to FIG. 8A, the electronic device 100 may be configured to allow access to Internet and location functions in a status ID 1 (e.g., foreground state), and can use the navigation or map application under a state that Internet function and a location function are allowed.

While the electronic device 100 is using the navigation or map application in the status ID 1, the electronic device 100 may receive the call command from the external electronic device and display a call screen as shown in FIG. 8B. At this time, if a call screen is displayed on the display 120, the state of the navigation or map application running in the status ID 1 is changed to the status ID 2 (for example, background). At this time, in status ID 2, an access right to Internet function and a location function can be denied.

In many cases, the navigation or map application that was executed prior to the call can be executed in status ID 2 after termination of the call. At this time, if the navigation or map application to be executed is an application created by a malicious provider, location information of the electronic device 100 can be leaked to the outside using the location function and the Internet function.

Referring to FIG. 8C, the navigation or map application is denied access to the internet function and the location function in the background state. Therefore, even if the application is created by a malicious provider, position information of the electronic device 100 cannot be leaked to the outside.

Figure 9A:
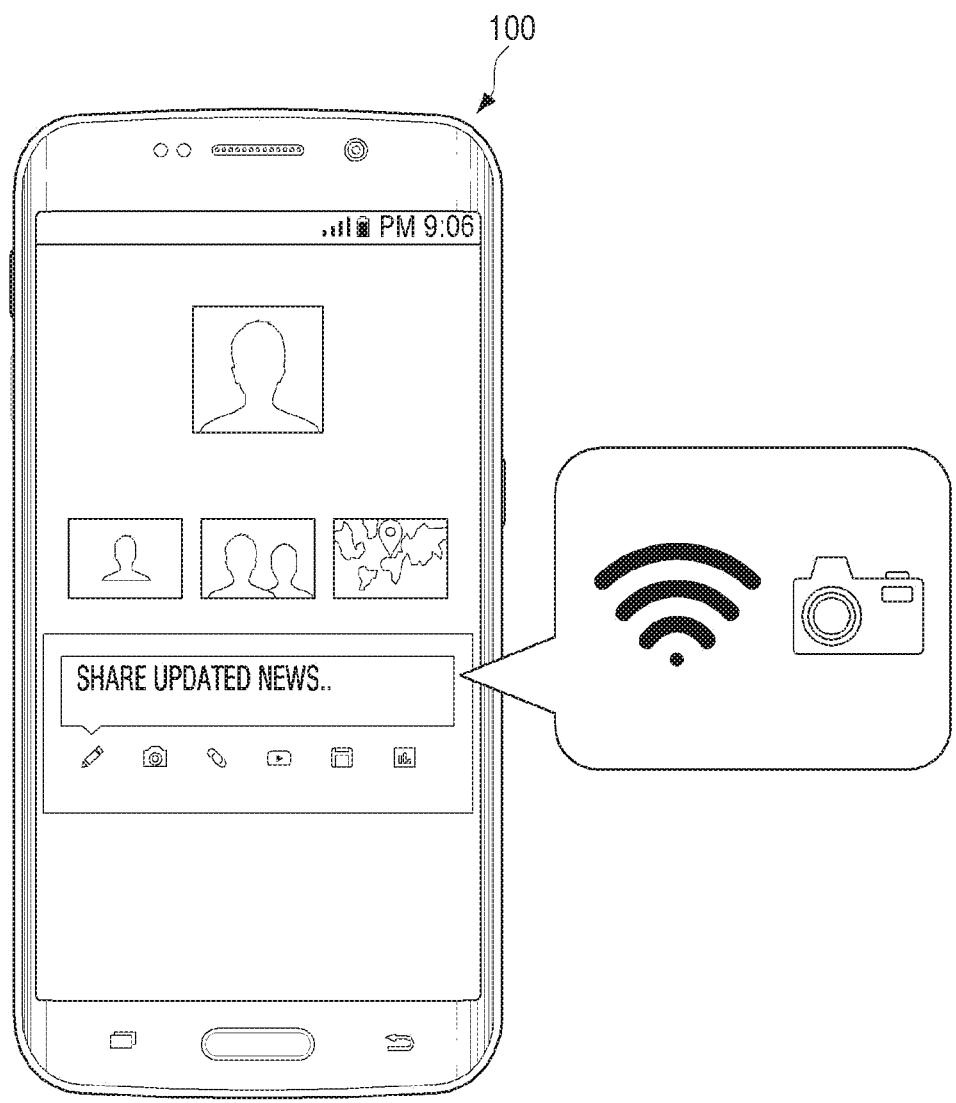
Figure 9B:
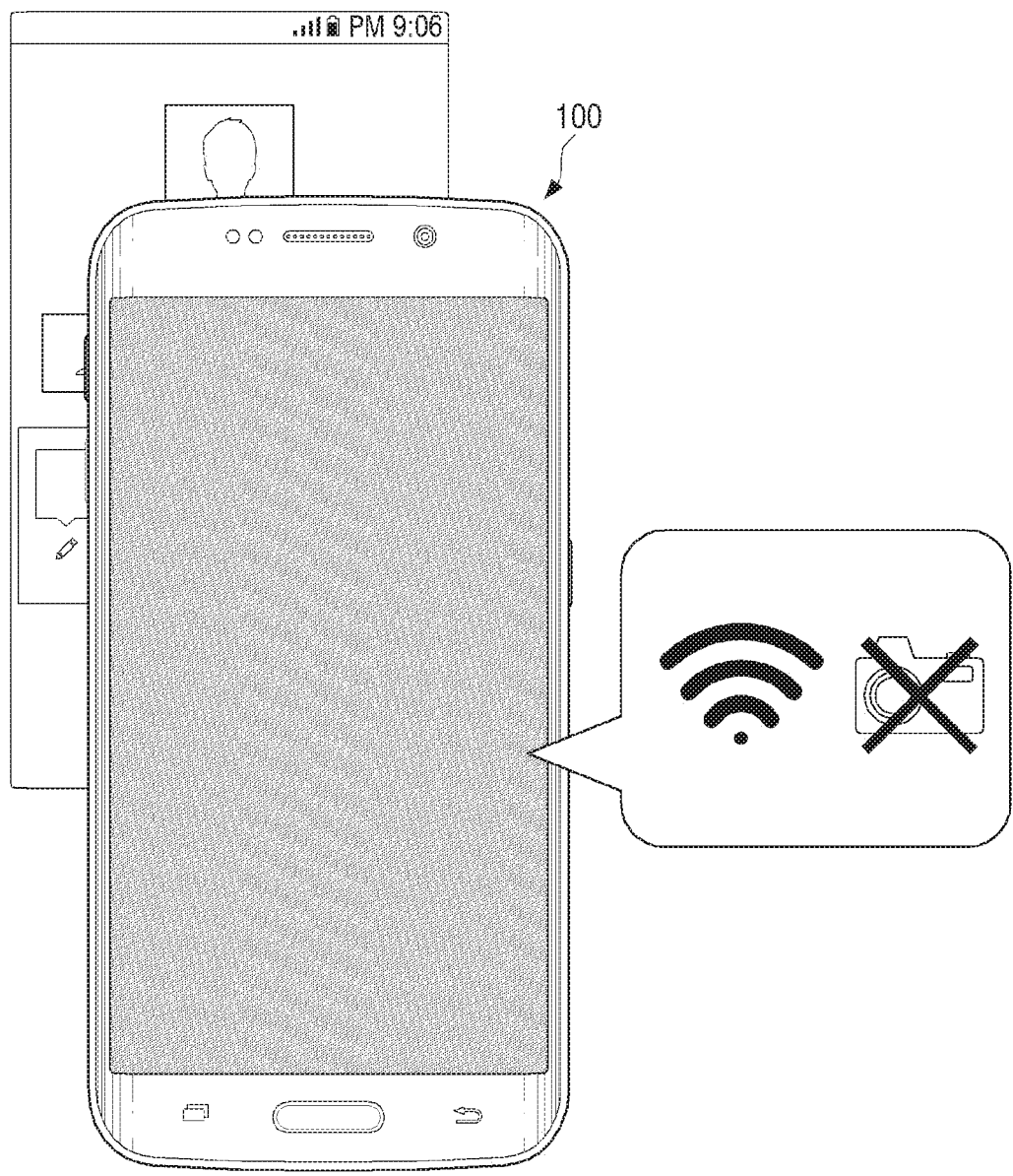

FIGS. 9A and 9B are views to describe a case of using an SNS application according to various embodiments of the disclosure.

Referring to FIG. 9A, the electronic device 100 can be configured to allow access to camera functions and Internet functions in a status ID 1 (e.g., foreground state), and an SNS application can be used while the access right to a camera function and Internet function are allowed.

The electronic device 100 may terminate the use of the SNS application in the status ID 1 and change the application state through a user command (for example, a user command for pushing a home button). At this time, the state of the application can be changed from the status ID 1 to the status ID 2 (background state).

When the running SNS application is an application manufactured by a malicious provider, photographing can be performed using a camera function and the photo can be leaked to the outside.

Referring to FIG. 9B, the SNS application is denied access right to the camera function in the background state. Therefore, even if the application is created by a malicious provider, the arbitrarily photographed photo cannot be leaked to the outside.

Figure 10A:
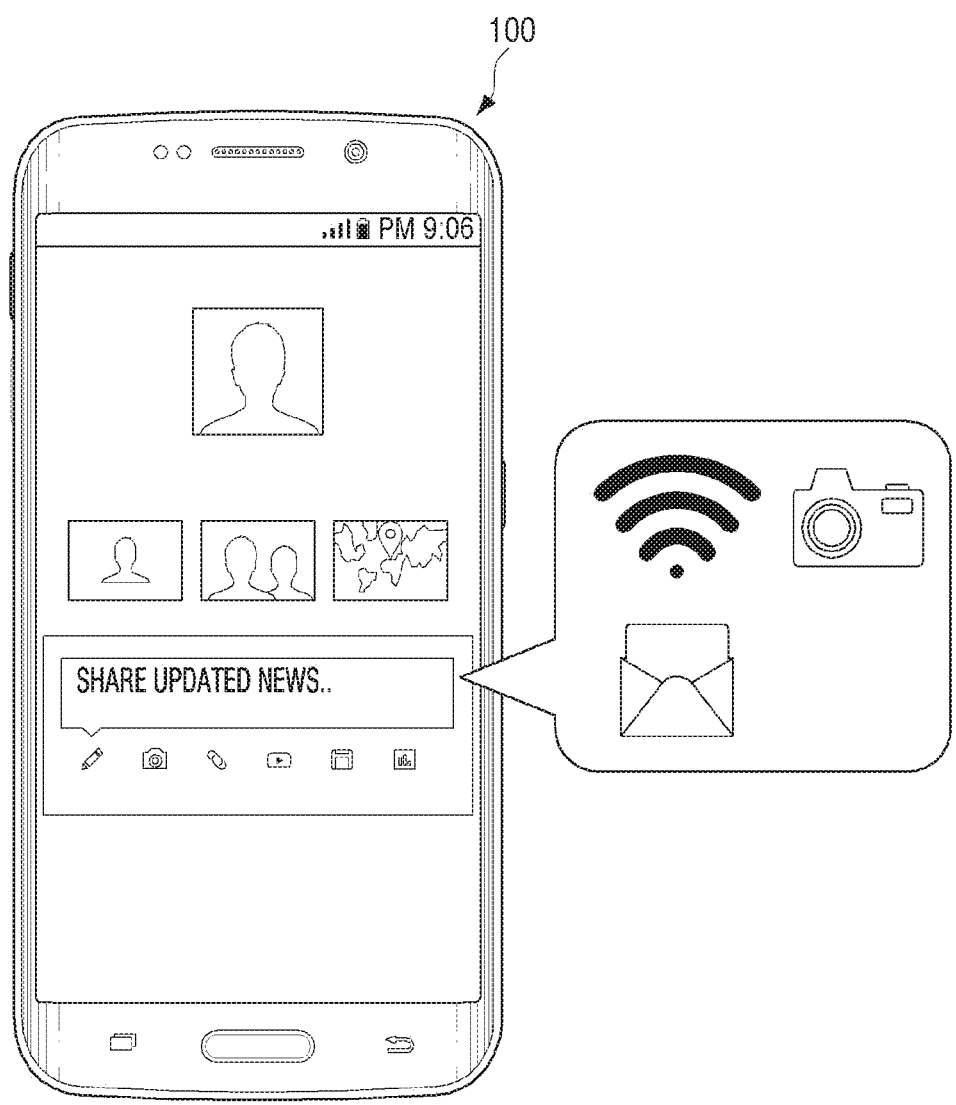
Figure 10B:
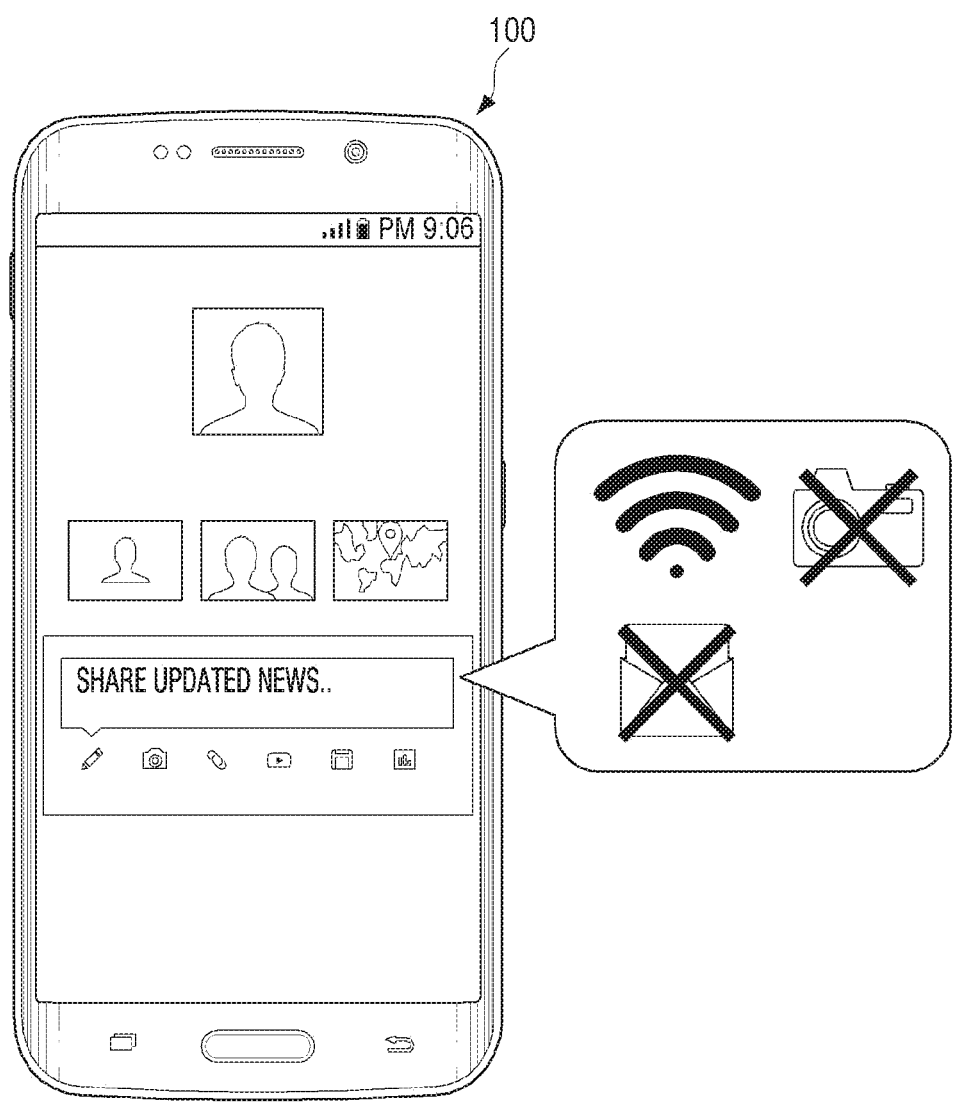

FIGS. 10A to 10C are views to describe a method of setting an access right to a function used one time according to various embodiments of the disclosure.

Specific applications may require access to the text, call, or camera functions for initial authentication at the first run. If the authentication of the user is not completed, the corresponding application cannot be used, so that the electronic device 100 can grant the access right to the functions necessary for authentication and then complete the authentication procedure.

Referring to FIG. 10A, the SNS application may require access right to a camera function and a text function for authentication. The electronic device 100, using the aforementioned various methods, may allow access right to a camera function, a map function, Internet function, and text function.

Referring to FIG. 10B, when the authentication for the SNS application is completed, the electronic device 100 can block access to the camera function and the text function necessary for the authentication. That is, since the right for initial authentication is often used only at the time of authentication, when the authentication is completed, the electronic device 100 needs to recover access right to the authority used at the time of authentication. At this time, the electronic device 100 can recover the access right of a specific function through various methods. For example, if a particular function has not been used for a predetermined time, the electronic device 100 may block access to certain functions. Alternatively, the electronic device 100 may allow the access right of a specific function only for a predetermined number of times or a predetermined time, and may block the access right for the remaining cases.

Referring to FIG. 10C, when an application is finally executed and a predetermined time has elapsed, access rights to all functions for which access rights have been granted can be blocked. That is, the electronic device 100 blocks the access right of an application that is not used for a long time, thereby preventing waste of unnecessary resources.

Figure 11A:
Figure 11B:
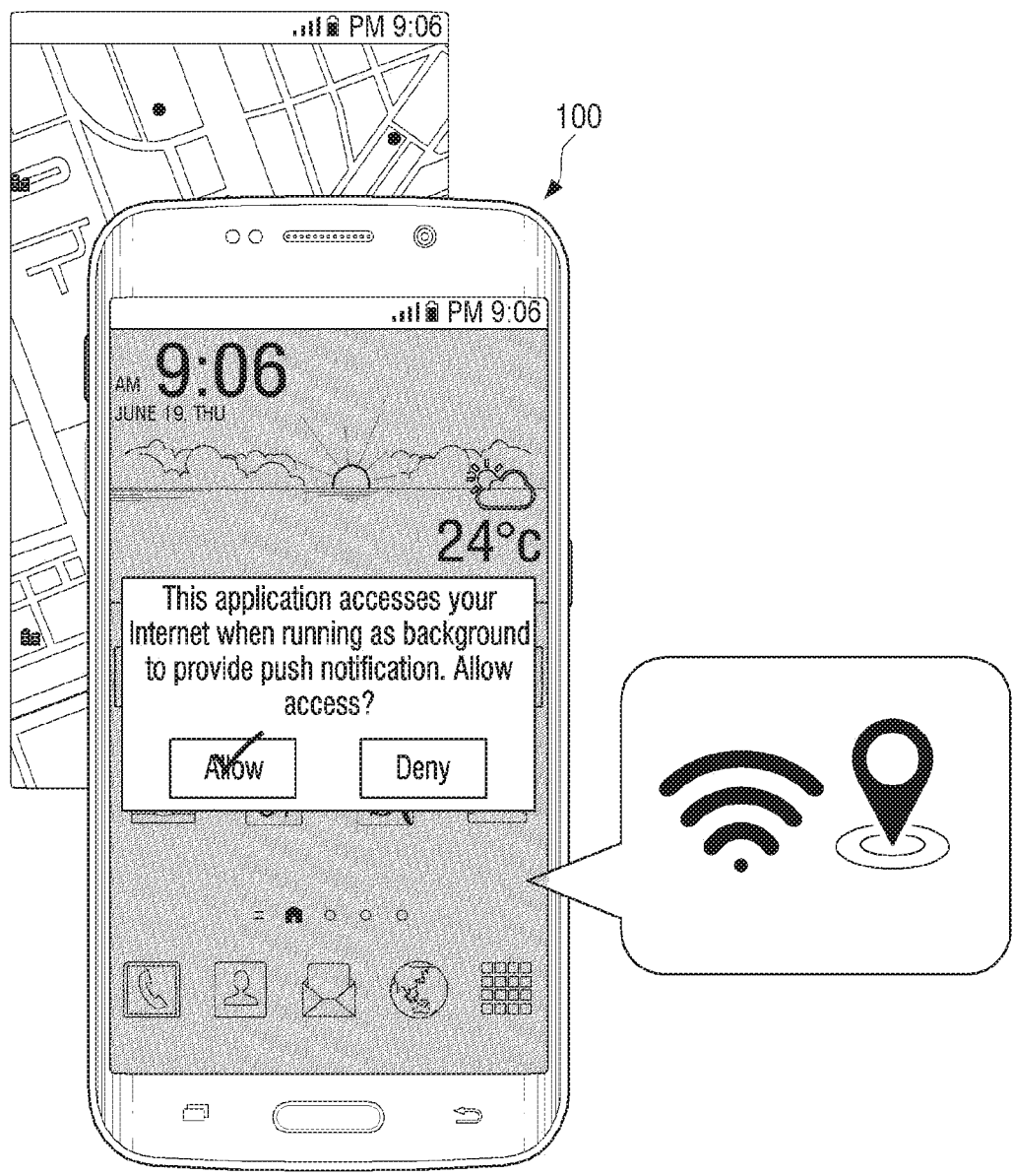
Figure 11C:
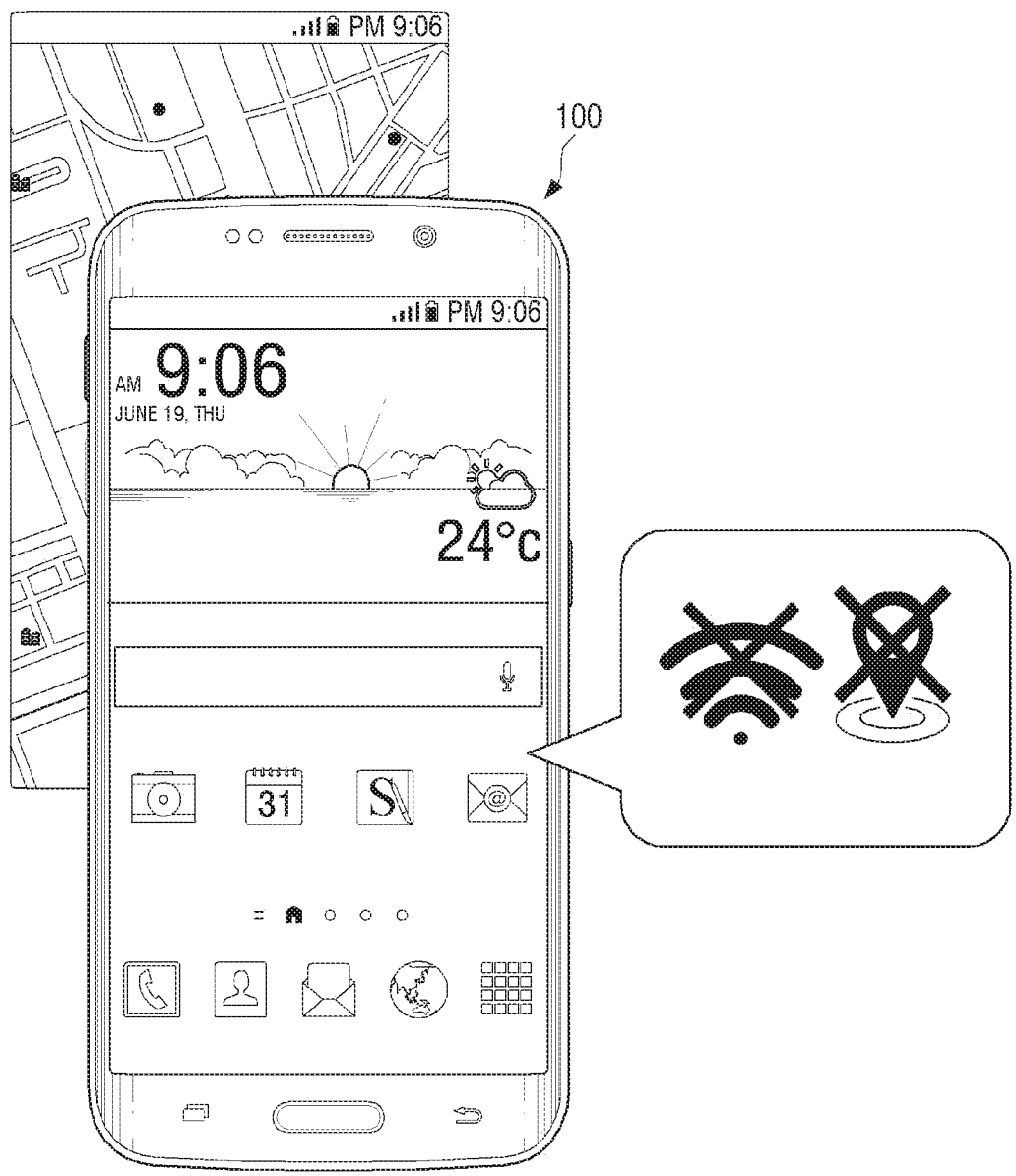

FIGS. 11A to 11C are views to describe various example of access right change according to various embodiment of the disclosure.

A UI inquiring access right changes can occur under various conditions. For example, as described above, when the electronic device 100 executes a map application, it may display a UI inquiring whether or not to permit access to the Internet function and the location function. Referring to FIG. 11A, when the access right to the Internet function and the location function is allowed, the map application can use the Internet function and the map function without the permission of the electronic device 100.

At this time, when the state of the map application is changed (for example, when the foreground state is changed to the background state), the electronic device 100 may display a UI inquiring whether or not to permit access to the Internet function. At this time, if the access right of the Internet function is allowed in the back ground state, the map application can use the Internet function without the permission of the electronic device 100 even in the background state, as shown in FIG. 11B.

At this time, when the map application is executed in the background state for a preset time, the electronic device 100 can display the UI inquiring as to whether or not to permit the access right to the Internet function. That is, when the map application is running in the background state, the electronic device 100 displays a UI inquiring whether or not to grant the access right to a specific function at a predetermined time interval, and the user can be informed that the access right is allowed.

In the meantime, as shown in FIGS. 11A and 11B, when a certain condition is satisfied in a state in which the access right to a specific function is allowed, without displaying a UI inquiring whether or not to grant the access right to the specific function, an access right to a specific function can be blocked.

Referring to FIG. 11C, when the battery of the electronic device 100 is consumed to a predetermined value or less while the map application is executed in the background state, the electronic device 100 may block access to all functions of the running map application in the background state. However, the above-described specific conditions may be various conditions as well as conditions in which the battery of the electronic device 100 is consumed below a predetermined value. For example, in a background condition, a map application may consume a battery for more than or equal to a predetermined value. Alternatively, the specific condition may be that the map application consumes network data over a predetermined value in the background state.

FIG. 11C illustrates a case in which the access right to all functions is blocked when the electronic device 100 satisfies a specific condition, but the disclosure is not limited thereto. For example, when the electronic device 100 satisfies a certain condition, it is possible to display the warning UI on the display window or display the warning message through the notification bar.

FIG. 12 is a flowchart to describe an operation of an electronic device according to an embodiment of the disclosure.

First, when the user command is input, the electronic device 100 can execute the application in operation S1210. The electronic device 100 may determine whether an event inquiring whether permission to access the function of the electronic device 100 occurs or not in operation S1220. For example, an application may need to use certain features of an electronic device to run an application. Therefore, when an application wants to use a specific function of an electronic device, the application needs access right to a specific function to be used. Here, the event may be an event for changing the state of the electronic device 100 or an application, an event for an application to use a specific function of the electronic device 100, or the like. If there is no event to inquire whether permission to access the function of the electronic device 100 occurs in operation S1220-N, the electronic device 100 may wait until it detects an event.

When an event inquiring about whether to allow an access right to a function of the electronic device 100 occurs in operation S1220-Y, the electronic device 100 may display a UI to identify whether to allow the access right to a function of the electronic device in operation S1230.

At this time, if the user command through the UI is inputted, the electronic device 100 may match the state of the application according to the event and the permission or denial of the access right according to the user command, and store the matching result in operation S1240. The stored matching result may then be used if the application wishes to use a particular function of the electronic device 100. For example, if the access right to the camera function is stored as "allow", in the status ID 1, the electronic device 100 can access the camera function in the status ID 1 if the application accesses the camera function.

A device (e.g., modules or electronic device 100) or method (e.g., operations) in accordance with various embodiments may be stored in a computer-readable storage medium, for example, may be performed by at least one computer (e.g., processor 130) executing instructions contained in at least one of the programs.

When the instruction is executed by a computer (e.g., processor 130), the at least one computer may perform a function corresponding to the instruction. At this time, a computer-readable storage medium may be, for example, the memory 110.

The program may be stored on a computer readable recording medium such as a hard disk, a floppy disk, magnetic media (e.g. magnetic tape), optical media (e.g., compact disc-read only memory (CD-ROM)), digital versatile disc (DVD), magneto-optical media such as floptical disks, hardware devices such as read only memory (ROM), random access memory (RAM), or flash memory. In this case, the storage medium is typically included as part of the configuration of the electronic device 100, but may be mounted through the port of the electronic device 100 or may be external to the electronic device 100, for example, a cloud, a server, or other electronic device. In addition, the program may be stored in a plurality of storage media, at least a part of the plurality of storage media may be located in an external device of the electronic device 100.

The instructions may include machine language code such as those generated by the compiler, as well as high-level language code that may be executed by a computer using an interpreter or the like. The hardware devices described above may be configured to operate as one or more software modules to perform the operations of the various embodiments, and vice versa.

While the disclosure has been particularly shown and described with reference to various embodiments thereof, it will be understood by those skilled in the art that various changes in form and details may be made therein without departing from the spirit and scope of the disclosure as defined by the appended claims and their equivalents.

What is claimed is:

1. A controlling method of an electronic device for executing an application, the method comprising:
   in response to an event for inquiring about whether to allow an access right to a function of the electronic device required for executing the application, displaying a user interface (UI) to confirm whether to allow the access right;
   in response to a user command being input through the UI, matching and storing a state of the application according to the event and a determination of whether to allow the access right according to the user command;
   in response to the application being initially executed, displaying a second UI for inquiring whether to allow aright required to execute a foreground, aright required to execute a background, and a right temporarily required for authentication; and
   when a second function corresponding to the application is temporarily required for authentication, and the authentication is completed, blocking an access right to the second function that is temporarily necessary for the authentication.

2. The method of claim 1, wherein the displaying of the UI comprises, in response to a change of an execution status of the application, displaying a UI for inquiring about whether to allow the access right to the function of the electronic device corresponding to the application.

3. The method of claim 2, further comprising:
   changing an execution status of the application from a status executed in a foreground to a status executed in a background; and
   in response to a change of the application from the foreground status to the background status, matching and storing a function corresponding to the background status with the determination of whether to allow the access right to the function.

4. The method of claim 3, further comprising:
   in response to the application being in the background status, executing the function according to a determination of whether to allow the access right stored in the background status.

5. The method of claim 3, further comprising:
   in response to the application being executed in the background, and a state of a battery of the electronic device being equal to or less than a preset value, blocking the access right to the function of the electronic device corresponding to the application.

6. The method of claim 1, further comprising:
   in response to the application not being executed for a predetermined time, blocking the access right to the function corresponding to the application.

7. The method of claim 1, further comprising:
   in response to the electronic device being connected to a predetermined network, allowing an access right to a network function corresponding to the application.

8. The method of claim 1, further comprising:
   in response to an event with respect to execution of a specific function of the electronic device occurring, determining whether an access right to an execution of the specific function is allowed; and
   in response to determining that the access right to the specific function is not being allowed, displaying a UI for confirming whether to allow an access right to the specific function.

9. An electronic device for executing an application, the electronic device comprising:
   a memory;
   a display; and
   at least one processor configured to:
      in response to an event for inquiring about whether to allow an access right to a function of the electronic device required for executing the application, control the display to display a user interface (UI) to confirm whether to allow the access right, and
      in response to a user command being input through the UI, control the memory to match and store a state of the application according to the event and a determination of whether to allow the access right according to the user command,
   wherein the at least one processor is further configured to, when a second function corresponding to the application is temporarily required for authentication and the authentication is completed, block an access right to the second function that is temporarily necessary for the authentication.

10. The electronic device of claim 9, wherein the at least one processor is further configured to, in response to a change of an execution status of the application, control the display to display a UI for inquiring about whether to allow the access right to the function of the electronic device corresponding to the application.

11. The electronic device of claim 10, wherein the at least one processor is further configured to:
   change an execution status of the application from a status executed in a foreground to a status executed in a background, and
   in response to a change of the application from the foreground status to the background status, control the memory to match and store a function corresponding to the background status with the determination of whether to allow the access right to the function.

12. The electronic device of claim 11, wherein the at least one processor is further configured to, in response to the application being in the background status, control the application to execute the function according to a determination of whether to allow the access right stored in the background status.

13. The electronic device of claim 11, wherein the at least one processor is further configured to, in response to the application being executed in the background, and a state of a battery of the electronic device being equal to or less than a preset value, block the access right to the function of the electronic device corresponding to the application.

14. The electronic device of claim 9, wherein the at least one processor is further configured to, in response to the application not being executed for a predetermined time, block the access right to the function corresponding to the application.

15. The electronic device of claim 9, further comprising: a communication circuit,
wherein the at least one processor is further configured to, in response to the electronic device being connected to a predetermined network, allow an access right to a network function corresponding to the application.

16. The electronic device of claim 9, wherein the at least one processor is further configured to:

in response to an event with respect to execution of a specific function of the electronic device occurring, determine whether an access right to an execution of the specific function is allowed, and in response to determining that the access right to the specific function is not being allowed, control the display to display a UI for confirming whether to allow an access right to the specific function.

17. The electronic device of claim 9, wherein the at least one processor is further configured to, in response to the application being initially executed, control the display to display a UI for inquiring whether to allow a right required to execute a foreground, a right required to execute a background, and a right temporarily required for authentication.

18. The electronic device of claim 16, wherein the at least one processor is further configured to determine whether the access right to the specific function is allowed based on a matching table stored in the memory.

* * * * *